US012738613B2

(12) United States Patent
Tsuchikawa

(10) Patent No.: US 12,738,613 B2
(45) Date of Patent: Sep. 15, 2026

(54) SHORT-CIRCUIT DEVICE FOR ELECTROCHEMICAL DEVICE AND SHORT-CIRCUIT DEVICE-EQUIPPED ELECTROCHEMICAL DEVICE

(71) Applicant: ZEON CORPORATION, Tokyo (JP)

(72) Inventor: Tomoya Tsuchikawa, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 197 days.

(21) Appl. No.: 18/841,483

(22) PCT Filed: Mar. 20, 2023

(86) PCT No.: PCT/JP2023/011007
§ 371 (c)(1),
(2) Date: Aug. 26, 2024

(87) PCT Pub. No.: WO2023/189858
PCT Pub. Date: Oct. 5, 2023

(65) Prior Publication Data

US 2025/0167411 A1 May 22, 2025

(30) Foreign Application Priority Data

Mar. 31, 2022 (JP) ................................ 2022-061280

(51) Int. Cl.
*H01M 50/583* (2021.01)
*H01G 11/16* (2013.01)
(Continued)

(52) U.S. Cl.
CPC .......... *H01M 50/583* (2021.01); *H01G 11/16* (2013.01); *H01G 11/18* (2013.01); *H01M 10/0525* (2013.01)

(58) Field of Classification Search
CPC .......... H01C 7/04; H01G 11/16; H01G 11/18; H01G 11/26; H01G 11/32; H01G 11/52;
(Continued)

(56) References Cited

FOREIGN PATENT DOCUMENTS

JP 2005149951 A * 6/2005
JP 2008130458 A * 6/2008
(Continued)

OTHER PUBLICATIONS

Machine translation of Nagayama et al. Japanese Patent Document JP 2005-149951 A Jun. 2005 (Year: 2005).*
(Continued)

*Primary Examiner* — Kevin J Comber
(74) *Attorney, Agent, or Firm* — KENJA IP LAW PC

(57) ABSTRACT

A short-circuit device for an electrochemical device includes: a first electrical conductor; a second electrical conductor; a porous conductive layer positioned between the first electrical conductor and the second electrical conductor; and an insulating layer positioned either or both of between the porous conductive layer and the first electrical conductor and between the porous conductive layer and the second electrical conductor. The insulating layer contains a thermoplastic resin and has an area density of more than 0.15 $mg/cm^2$, and when this area density is taken to be Ma and the area density of the porous conductive layer is taken to be Mb, a relationship formula: $0.15 \leq Ma/Mb \leq 2.40$ is satisfied.

5 Claims, 1 Drawing Sheet

(51) Int. Cl.
*H01G 11/18* (2013.01)
*H01M 10/0525* (2010.01)

(58) Field of Classification Search
CPC ... H01G 11/70; H01G 11/74; H01M 10/0525; H01M 10/4235; H01M 50/572; H01M 50/574; H01M 50/583; Y02E 60/10
USPC .............................................................. 361/1
See application file for complete search history.

(56) References Cited

FOREIGN PATENT DOCUMENTS

| JP | 2013004212 A | * | 1/2013 |
|---|---|---|---|
| JP | 2014022284 A | * | 2/2014 |
| JP | 2016126880 A | * | 7/2016 |

OTHER PUBLICATIONS

Machine translation of Kano et al. Japanese Patent Document JP 2008-130458 A Jun. 2008 (Year: 2008).*
Machine translation of Matsui Japanese Patent Document JP 2013-4212 A Jan. 2013 (Year: 2013).*
Machine translation of Shibata et al. Japanese Patent Document JP 2014-22284 A Feb. 2014 (Year: 2014).*
Machine translation of Shimura et al. Japanese Patent Document JP 2016-126880 A Jul. 2016 (Year: 2016).*
Feb. 10, 2026, the Extended European Search Report issued by the European Patent Office in the corresponding European Patent Application No. 23779874.9.
Sep. 24, 2024, International Preliminary Report on Patentability issued in the International Patent Application No. PCT/JP2023/011007.

* cited by examiner

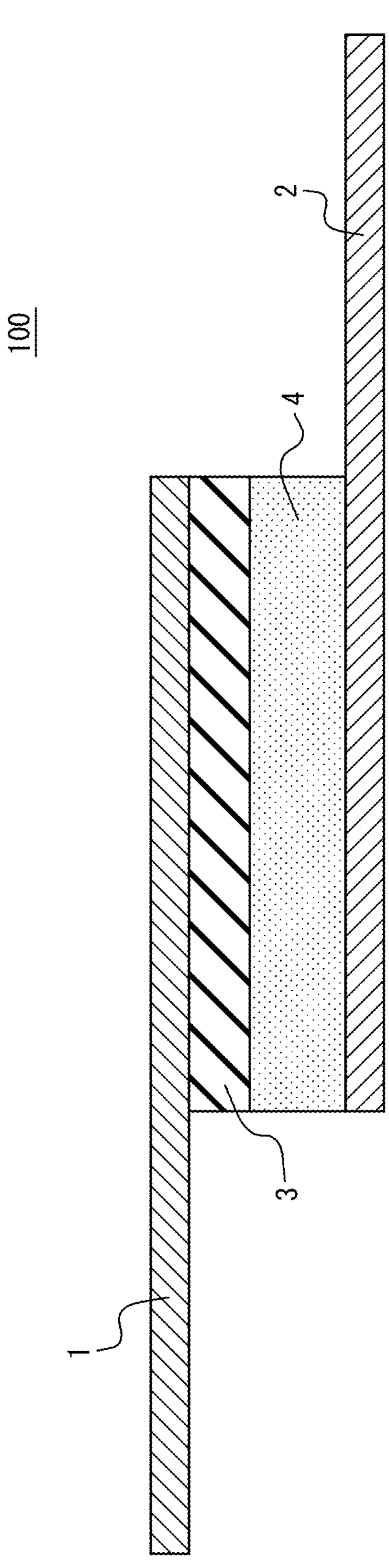
100
1
2
3
4

SHORT-CIRCUIT DEVICE FOR ELECTROCHEMICAL DEVICE AND SHORT-CIRCUIT DEVICE-EQUIPPED ELECTROCHEMICAL DEVICE

TECHNICAL FIELD

The present disclosure relates to a short-circuit device for an electrochemical device and a short-circuit device-equipped electrochemical device.

BACKGROUND

Electrochemical devices such as lithium ion secondary batteries and electric double-layer capacitors have characteristics such as compact size, light weight, high energy-density, and the ability to be repeatedly charged and discharged, and are used in a wide variety of applications.

When the temperature of an electrochemical device such as a lithium ion secondary battery rises excessively due to an internal short circuit or heating from externally to the electrochemical device, for example, while the electrochemical device maintains a charged state, a condition where temperature control is not possible (also referred to as "thermal runaway") may arise, and, in some cases, this may lead to an event such as rupture, ignition, or the like of the electrochemical device.

In order to prevent such events, it has been proposed that a short-circuit device is provided between a positive electrode and a negative electrode of an electrochemical device. This short-circuit device functions as an electrical insulator in a temperature range in which the electrochemical device is normally used, but when the electrochemical device reaches a high temperature exceeding this range, the short-circuit device functions as an electrical conductor, causes short-circuiting of the positive electrode and the negative electrode, and enables discharging of the electrochemical device to a safe charge level before thermal runaway occurs.

For example, Patent Literature (PTL) 1 proposes a short-circuit device including a first terminal that is connected to a positive electrode and second terminal that is connected to a negative electrode and that is positioned such as to be opposite the first terminal via an insulating member that melts at a specific temperature, wherein the first terminal and the second terminal are biased in a direction toward each other. According to PTL 1, external force is applied through a member such as a clip or a spring in order to bias the first terminal and the second terminal in a direction toward each other.

Moreover, PTL 2 proposes a short-circuit device including a first electrical conductor that is electrically connected to a positive electrode side, a second electrical conductor that is electrically connected to a negative electrode side, a melting layer that is positioned between the first electrical conductor and the second electrical conductor, a thermal expansion member that is positioned at an outer side of at least one of the first electrical conductor and the second electrical conductor and that expands at around a specific temperature, and an expansion restriction member that restricts expansion of combined volume of the thermal expansion member, the first electrical conductor, the second electrical conductor, and the melting layer.

CITATION LIST

Patent Literature

PTL 1: JP2008-130458A
PTL 2: JP2014-022284A

SUMMARY

Technical Problem

In the short-circuit devices of the conventional techniques described above, a member that applies external force (for example, a clip, spring, or the like in PTL 1 and a thermal expansion member or the like in PTL 2) has been necessary in order to cause short-circuiting of a positive electrode and a negative electrode.

However, from a viewpoint of achieving improvement of energy density and compactization of an electrochemical device including a short-circuit device, it would be preferable for a short-circuit device to not include a member applying external force such as described above. Moreover, it would also be preferable for a short-circuit device to not include a member applying external force from a viewpoint of reducing restriction of positioning when connecting the short-circuit device to an electrochemical device.

Accordingly, one object of the present disclosure is to provide a short-circuit device for an electrochemical device that can function as a short-circuit device without the need for a member applying external force.

Another object of the present disclosure is to provide a short-circuit device-equipped electrochemical device that includes this short-circuit device for an electrochemical device.

Solution to Problem

The inventor conducted diligent studies to achieve the objects set forth above. The inventor discovered that in the case of a short-circuit device that is obtained by positioning a porous conductive layer between a first electrical conductor and a second electrical conductor, by further positioning an insulating layer that contains a thermoplastic resin and has an area density of more than a specific value between the porous conductive layer and the first electrical conductor and/or between the porous conductive layer and the second electrical conductor, and by adjusting the area density of the insulating layer and the area density of the porous conductive layer so as to satisfy a specific relationship formula, this short-circuit device can adequately function as a short-circuit device for an electrochemical device without the need for a member applying external force. In this manner, the inventor completed the present disclosure.

Specifically, with the aim of advantageously solving the problem set forth above, [1] a presently disclosed short-circuit device for an electrochemical device comprises: a first electrical conductor; a second electrical conductor; a porous conductive layer positioned between the first electrical conductor and the second electrical conductor; and an insulating layer positioned either or both of between the porous conductive layer and the first electrical conductor and between the porous conductive layer and the second electrical conductor, wherein the insulating layer contains a thermoplastic resin, the insulating layer has an area density of more than 0.15 $mg/cm^2$, and when the area density of the insulating layer is taken to be Ma and area density of the porous conductive layer is taken to be Mb, a relationship formula: 0.15≤Ma/Mb≤2.40 is satisfied. A short-circuit device for an electrochemical device having the configuration set forth above can function as a short-circuit device without the need for a member applying external force.

Note that the phrase "can function as a short-circuit device" as used in the present disclosure means that the short-circuit device for an electrochemical device (hereinafter, also referred to simply as a "short-circuit device") has both insulating performance and short-circuiting performance (i.e., that insulating performance and short-circuiting performance are both realized in the short-circuit device).

Moreover, "insulating performance" of a short-circuit device referred to in the present disclosure means performance whereby, when the short-circuit device is connected to an electrochemical device for use, the short-circuit device enables the reliable maintenance of insulation between a positive electrode and a negative electrode of the electrochemical device in a temperature range in which the electrochemical device is normally used (for example, lower than 60° C.).

On the other hand, "short-circuiting performance" of a short-circuit device referred to in the present disclosure means performance whereby, when the short-circuit device is connected to an electrochemical device for use, the short-circuit device enables the reliable short-circuiting of a positive electrode and a negative electrode of the electrochemical device at a temperature (for example, 60° C. or higher) exceeding a temperature range in which the electrochemical device is normally used.

Furthermore, when a short-circuit device is said to "not need a member applying external force" in the present disclosure, this means that the short-circuit device does not need a member applying external force in order to function as a short-circuit device (particularly in order to display short-circuiting performance).

Note that the term "area density" as used in the present disclosure refers to the mass per unit area.

[2] In the short-circuit device for an electrochemical device according to the foregoing [1], the thermoplastic resin preferably includes a particulate thermoplastic resin. By using a particulate thermoplastic resin as the thermoplastic resin, it is possible to further improve short-circuiting performance of the short-circuit device.

[3] In the short-circuit device for an electrochemical device according to the foregoing [1] or [2], the thermoplastic resin preferably includes a particulate polymer having a core-shell structure. By using a particulate polymer having a core-shell structure as the thermoplastic resin, it is possible to realize high levels of both insulating performance and short-circuiting performance of the short-circuit device.

Note that a "core-shell structure" of a particulate polymer referred to in the present disclosure can be confirmed through observation using a scanning electron microscope.

[4] In the short-circuit device for an electrochemical device according to any one of the foregoing [1] to [3], the porous conductive layer preferably contains a conductive material that includes a carbon material. By using a carbon material as a conductive material, it is possible to further improve short-circuiting performance of the short-circuit device for an electrochemical device because a good porous structure can be formed in the porous conductive layer.

[5] Moreover, with the aim of advantageously solving the problem set forth above, a presently disclosed short-circuit device-equipped electrochemical device comprises: an electrochemical device; and the short-circuit device for an electrochemical device according to any one of the foregoing [1] to [4], wherein the electrochemical device and the short-circuit device for an electrochemical device are connected. The presently disclosed short-circuit device-equipped electrochemical device can inhibit the occurrence of thermal runaway caused by an excessive temperature rise and has excellent safety as a result of the presently disclosed short-circuit device set forth above being connected to the electrochemical device.

Advantageous Effect

According to the present disclosure, it is possible to provide a short-circuit device for an electrochemical device that can cause short-circuiting of a positive electrode and a negative electrode without the inclusion of a member applying external force.

Moreover, according to the present disclosure, it is possible to provide a short-circuit device-equipped electrochemical device that includes this short-circuit device for an electrochemical device.

BRIEF DESCRIPTION OF THE DRAWINGS

In the accompanying drawings:

FIG. 1 is a cross-sectional view schematically illustrating configuration of a short-circuit device for an electrochemical device according to one embodiment of the present disclosure.

DETAILED DESCRIPTION

The following provides a detailed description of embodiments of the present disclosure.

The presently disclosed short-circuit device for an electrochemical device can suitably be used as a short-circuit device for an electrochemical device such as a lithium ion secondary battery or an electric double-layer capacitor, for example.

Moreover, the presently disclosed short-circuit device-equipped electrochemical device includes the presently disclosed short-circuit device for an electrochemical device. The presently disclosed short-circuit device-equipped electrochemical device can be produced by connecting the presently disclosed short-circuit device for an electrochemical device to an electrochemical device such as a lithium ion secondary battery or an electric double-layer capacitor, for example.

(Short-Circuit Device for Electrochemical Device)

Features of the presently disclosed short-circuit device for an electrochemical device are that it includes a first electrical conductor, a second electrical conductor, a porous conductive layer positioned between the first electrical conductor and the second electrical conductor, and an insulating layer positioned either or both of between the porous conductive layer and the first electrical conductor and between the porous conductive layer and the second electrical conductor, that the insulating layer contains a thermoplastic resin, that the insulating layer has an area density of more than 0.15 $mg/cm^2$, and that when the area density of the insulating layer is taken to be Ma and area density of the porous conductive layer is taken to be Mb, a relationship formula: 0.15≤Ma/Mb≤2.40 is satisfied.

The presently disclosed short-circuit device for an electrochemical device can be connected to an electrochemical device such as a lithium ion secondary battery or an electric double-layer capacitor for use, for example, but is not specifically limited to being used in this manner.

Moreover, the presently disclosed short-circuit device for an electrochemical device can cause short-circuiting of a positive electrode and a negative electrode, without the inclusion of a member applying external force, at a high temperature exceeding a temperature range in which an electrochemical device is normally used. This enables discharging of the electrochemical device to a safe charge level before thermal runaway occurs.

The following provides a more detailed description of one embodiment of the presently disclosed short-circuit device for an electrochemical device with reference to FIG. 1. However, the presently disclosed short-circuit device for an electrochemical device is not limited to this embodiment.

FIG. 1 is a cross-sectional view schematically illustrating configuration of a short-circuit device for an electrochemical device according to one embodiment of the present disclosure.

A short-circuit device 100 for an electrochemical device includes a first electrical conductor 1, a second electrical conductor 2, a porous conductive layer 4 positioned between the first electrical conductor 1 and the second electrical conductor 2, and an insulating layer 3 positioned between the porous conductive layer 4 and the first electrical conductor 1. In other words, the short-circuit device 100 for an electrochemical device is a laminate having the first electrical conductor 1, the insulating layer 3, the porous conductive layer 4, and the second electrical conductor 2 positioned in this order.

Any layer (for example, an adhesive layer) may be interposed between the first electrical conductor 1 and the insulating layer 3 to the extent that the desired effects according to the present disclosure are obtained, though the first electrical conductor 1 and the insulating layer 3 are normally in direct contact.

Any layer (for example, an adhesive layer) may be interposed between the insulating layer 3 and the porous conductive layer 4 to the extent that the desired effects according to the present disclosure are obtained, though the insulating layer 3 and the porous conductive layer 4 are normally in direct contact.

The porous conductive layer 4 and the second electrical conductor are electrically connected. Note that any layer (for example, an adhesive layer) may be interposed between the porous conductive layer 4 and the second electrical conductor to the extent that electrical connection is sufficiently ensured, though the porous conductive layer 4 and the second electrical conductor are normally in direct contact.

The short-circuit device 100 for an electrochemical device is connected to an electrochemical device such as a lithium ion secondary battery for use. When the short-circuit device 100 for an electrochemical device is connected to the electrochemical device, the first electrical conductor 1 may be connected to a positive electrode of the electrochemical device and the second electrical conductor 2 may be connected to a negative electrode of the electrochemical device, or the first electrical conductor 1 may be connected to a negative electrode of the electrochemical device and the second electrical conductor 2 may be connected to a positive electrode of the electrochemical device, for example, though no specific limitations are made.

In a temperature range in which an electrochemical device such as a lithium ion secondary battery is normally used (for example, lower than 60° C.), the presence of the insulating layer 3 between the first electrical conductor 1 and the porous conductive layer 4 that is electrically connected to the second electrical conductor 2 results in insulation between the first electrical conductor 1 and the second electrical conductor 2, and thus also insulation between a positive electrode and a negative electrode of the electrochemical device.

On the other hand, in a situation in which a temperature range in which an electrochemical device is normally used is exceeded (for example, at 60° C. or higher), softening of the thermoplastic resin that is a constituent of the insulating layer 3 results in at least one of the following effects:

(1) at least a portion of the insulating layer 3 infiltrates a porous structure of the porous conductive layer 4, and, in accompaniment thereto, the first electrical conductor 1 adjacent to the insulating layer 3 moves toward the porous conductive layer 4;

(2) at least a portion of the porous conductive layer 4 adjacent to the insulating layer 3 undergoes deformation or the like and moves toward the first electrical conductor 1.

These effects cause the first electrical conductor 1 and the porous conductive layer 4 to come into contact and cause electrical connection of the first electrical conductor 1 and the second electrical conductor 2, thereby enabling short-circuiting of the positive electrode and the negative electrode of the electrochemical device.

In this manner, the short-circuit device 100 for an electrochemical device can insulate between a positive electrode and a negative electrode of an electrochemical device in a temperature range in which the electrochemical device is normally used and can cause short-circuiting of the positive electrode and the negative electrode of the electrochemical device in a situation in which the temperature range in which the electrochemical device is normally used is exceeded, thereby enabling the short-circuit device 100 for an electrochemical device to function as a short-circuit device for an electrochemical device without the need for a member applying external force.

When the area density of the insulating layer 3 is taken to be Ma and the area density of the porous conductive layer 4 is taken to be Mb, the short-circuit device 100 for an electrochemical device satisfies a relationship formula: $0.15 \leq Ma/Mb \leq 2.40$.

In a situation in which the value of the ratio Ma/Mb of the area density Ma of the insulating layer 3 and the area density Mb of the porous conductive layer 4 is less than 0.15 (i.e., $0.15 > Ma/Mb$), this means that the area density Ma of the insulating layer 3 is excessively small relative to the area density Mb of the porous conductive layer 4, and thus the porous conductive layer 4 and the first electrical conductor 1 that is adjacent to the insulating layer 3 may come into contact even in a temperature range in which an electrochemical device is normally used as a result of the insulating layer 3 easily being squashed, the insulating layer 3 easily infiltrating the porous structure of the porous conductive layer 4, and/or at least a portion of the porous conductive layer 4 undergoing deformation or the like and easily piercing through the insulating layer 3 due to physical compression or the like. Therefore, in a situation in which the value of Ma/Mb is less than 0.15, it is not possible to reliably maintain insulation between a positive electrode and a negative electrode of an electrochemical device even in a temperature range in which the electrochemical device is normally used. On the other hand, when the value of the ratio Ma/Mb of the area density Ma of the insulating layer 3 and the area density Mb of the porous conductive layer 4 is 0.15 or more (i.e., $0.15 \leq Ma/Mb$), insulation between a positive electrode and a negative electrode of an electrochemical device can be reliably maintained in a temperature range in which the electrochemical device is normally used.

Furthermore, in a situation in which the value of the ratio Ma/Mb of the area density Ma of the insulating layer 3 and the area density Mb of the porous conductive layer 4 is more than 2.40 (i.e., Ma/Mb>2.40), the area density Ma of the insulating layer 3 is excessively large relative to the area density Mb of the porous conductive layer 4, which means that the insulating layer 3 does not sufficiently infiltrate the porous structure of the porous conductive layer 4 even when a temperature range in which an electrochemical device is normally used is exceeded and that there is a long distance between the first electrical conductor 1 and the porous conductive layer 4 via the insulating layer 3, thus making it difficult for the porous conductive layer 4 and the first electrical conductor 1 that is adjacent to the insulating layer 3 to come into contact. Therefore, in a situation in which the value of Ma/Mb exceeds 2.40, it is not possible to reliably cause short-circuiting of a positive electrode and a negative electrode of an electrochemical device even when a temperature range in which the electrochemical device is normally used is exceeded. On the other hand, when the value of the ratio Ma/Mb of the area density Ma of the insulating layer 3 and the area density Mb of the porous conductive layer 4 is 2.40 or less (i.e., Ma/Mb≤2.40), it is possible to reliably cause short-circuiting of a positive electrode and a negative electrode of an electrochemical device in a situation in which a temperature range in which the electrochemical device is normally used is exceeded.

The value of the ratio Ma/Mb of the area density Ma of the insulating layer 3 and the area density Mb of the porous conductive layer 4 is preferably 0.18 or more, more preferably 0.20 or more, even more preferably 0.22 or more, further preferably 0.25 or more, even further preferably 0.40 or more, and particularly preferably 0.50 or more, and is preferably 2.2 or less, more preferably 2.0 or less, even more preferably 1.8 or less, further preferably 1.5 or less, even further preferably 1.2 or less, and particularly preferably 1.0 or less. When the value of the ratio Ma/Mb of the area density Ma of the insulating layer 3 and the area density Mb of the porous conductive layer 4 is not less than any of the lower limits set forth above, insulating performance of the short-circuit device 100 for an electrochemical device can be further improved. On the other hand, when the value of the ratio Ma/Mb of the area density Ma of the insulating layer 3 and the area density Mb of the porous conductive layer 4 is not more than any of the upper limits set forth above, short-circuiting performance of the short-circuit device 100 for an electrochemical device can be further improved.

The area density Ma of the insulating layer 3 is required to be more than 0.15 $mg/cm^2$, is preferably 0.18 $mg/cm^2$ or more, more preferably 0.20 $mg/cm^2$ or more, even more preferably 0.22 $mg/cm^2$ or more, further preferably 0.25 $mg/cm^2$ or more, even further preferably 0.35 $mg/cm^2$ or more, and particularly preferably 0.50 $mg/cm^2$ or more, and is preferably 0.95 $mg/cm^2$ or less, more preferably 0.90 $mg/cm^2$ or less, even more preferably 0.80 $mg/cm^2$ or less, further preferably 0.75 $mg/cm^2$ or less, even further preferably 0.70 $mg/cm^2$ or less, and particularly preferably 0.65 $mg/cm^2$ or less.

In a situation in which the area density Ma of the insulating layer 3 is 0.15 $mg/cm^2$ or less, this means that the area density of the insulating layer 3 is excessively small, and thus the porous conductive layer 4 and the first electrical conductor 1 that is adjacent to the insulating layer 3 may come into contact even in a temperature range in which an electrochemical device is normally used as a result of the insulating layer 3 easily being squashed, the insulating layer 3 easily infiltrating the porous structure of the porous conductive layer 4, and/or at least a portion of the porous conductive layer 4 undergoing deformation or the like and easily piercing through the insulating layer 3 due to physical compression or the like. Consequently, the short-circuit device 100 for an electrochemical device cannot display insulating performance. In contrast, the short-circuit device 100 for an electrochemical device can display insulating performance when the area density Ma of the insulating layer 3 is more than 0.15 $mg/cm^2$.

Moreover, when the area density Ma of the insulating layer 3 is not less than any of the lower limits set forth above, insulating performance of the short-circuit device 100 for an electrochemical device can be further improved.

Furthermore, when the area density Ma of the insulating layer 3 is not more than any of the upper limits set forth above, short-circuiting performance of the short-circuit device 100 for an electrochemical device can be further improved because the area density of the insulating layer 3 is restricted from becoming excessively large.

The area density Mb of the porous conductive layer 4 is preferably 0.21 $mg/cm^2$ or more, more preferably 0.23 $mg/cm^2$ or more, even more preferably 0.25 $mg/cm^2$ or more, further preferably 0.30 $mg/cm^2$ or more, even further preferably 0.40 $mg/cm^2$ or more, and particularly preferably 0.50 $mg/cm^2$ or more, and is preferably 3.8 $mg/cm^2$ or less, more preferably 3.0 $mg/cm^2$ or less, even more preferably 2.1 $mg/cm^2$ or less, further preferably 1.6 $mg/cm^2$ or less, even further preferably 1.2 $mg/cm^2$ or less, and particularly preferably 1.1 $mg/cm^2$ or less. When the area density Mb of the porous conductive layer 4 is not less than any of the lower limits set forth above, short-circuiting performance of the short-circuit device 100 for an electrochemical device can be further improved. On the other hand, when the area density Mb of the porous conductive layer 4 is not more than any of the upper limits set forth above, insulating performance of the short-circuit device 100 for an electrochemical device can be further improved.

The following describes each constituent member of the short-circuit device 100 for an electrochemical device in order.

<First Electrical Conductor 1 and Second Electrical Conductor 2>

No specific limitations are placed on the first electrical conductor 1 and the second electrical conductor 2 so long as they can function as electrical conductors. For example, a substrate formed of a metal material such as aluminum, copper, nickel, or stainless steel can be used as the first electrical conductor 1 and the second electrical conductor 2. It should be noted that the first electrical conductor 1 and the second electrical conductor 2 may be formed of the same material or may be formed of different materials. For example, an aluminum foil substrate can be used as the first electrical conductor 1, and a copper foil substrate can be used as the second electrical conductor 2.

The shape of the first electrical conductor 1 and the second electrical conductor 2 may be a sheet-like shape, for example, but is not specifically limited thereto. In a case in which a sheet-shaped electrical conductor is used as the first electrical conductor 1 and/or the second electrical conductor, the thickness of the sheet-shaped electrical conductor is not specifically limited and can be adjusted as appropriate to the extent that the desired effects according to the present disclosure are obtained.

<Insulating Layer 3>

The insulating layer 3 is a layer that contains at least a thermoplastic resin. The insulating layer 3 may further contain components other than the thermoplastic resin to the extent that the desired effects according to the present disclosure are obtained. Examples of components other than the thermoplastic resin include a binder, a thickener, and so forth.

<<Thermoplastic Resin>>

The thermoplastic resin that is contained in the insulating layer 3 is preferably a material that is electrically insulating and that can soften at a temperature exceeding a temperature range in which an electrochemical device is normally used.

The type of thermoplastic resin that is contained in the insulating layer 3 can be selected as appropriate depending on the temperature range in which an electrochemical device connected to the short-circuit device 100 for an electrochemical device is normally used and the desired short-circuit initiation temperature (i.e., the temperature at which the short-circuit device 100 for an electrochemical device initiates short-circuiting).

Specific examples of the thermoplastic resin that is contained in the insulating layer 3 include polyolefins such as polyethylene (PE), polypropylene (PP), copolymerized polyolefins, polyolefin derivatives (for example, chlorinated polyethylene), and polyolefin wax; petroleum wax; carnauba wax; ester wax (for example, wax formed of an ester compound of a fatty acid and an alcohol such as a polyhydric alcohol); polycycloolefins; polystyrene; polyvinyl chloride; polyurethane; acrylic resins such as polymethyl methacrylate; and particulate polymers having a core-shell structure.

The polyethylene may be low-density polyethylene, high-density polyethylene, ultra-high molecular weight polyethylene, or the like.

The copolymerized polyolefin may be an ethylene-vinyl monomer copolymer, and, more specifically, may be an ethylene-vinyl acetate copolymer (EVA); an ethylene-acrylic acid ester copolymer such as an ethylene-methyl acrylate copolymer or an ethylene-ethyl acrylate copolymer; or the like.

The proportional content of structural units derived from ethylene (ethylene units) in the copolymerized polyolefin is preferably 85 mol % or more.

One of these thermoplastic resins may be used individually, or two or more of these thermoplastic resins may be used in combination in a freely selected ratio.

In a case in which the thermoplastic resin that is contained in the insulating layer 3 has a melting point, the melting point of the thermoplastic resin is preferably 80° C. or higher, and is preferably 200° C. or lower, more preferably 160° C. or lower, even more preferably 140° C. or lower, and further preferably 130° C. or lower. When the melting point of the thermoplastic resin is not lower than the lower limit set forth above, softening of the thermoplastic resin contained in the insulating layer 3 can be inhibited in a temperature range in which an electrochemical device is normally used, and thus insulating performance of the short-circuit device 100 for an electrochemical device can be further improved. On the other hand, when the melting point of the thermoplastic resin is not higher than any of the upper limits set forth above, the thermoplastic resin contained in the insulating layer 3 softens well in a situation in which the temperature at which an electrochemical device is normally used is exceeded, and thus short-circuiting performance of the short-circuit device 100 for an electrochemical device can be further improved.

Note that the "melting point" of the thermoplastic resin that is referred to in the present disclosure can be determined through the melting temperature measured using a differential scanning calorimeter (DSC) in accordance with the provisions of JIS K 7121.

In a case in which the thermoplastic resin that is contained in the insulating layer 3 has a glass-transition temperature, the glass-transition temperature of the thermoplastic resin is preferably 70° C. or higher, more preferably 80° C. or higher, and even more preferably 90° C. or higher, and is preferably 150° C. or lower, more preferably 120° C. or lower, and even more preferably 110° C. or lower. When the glass-transition temperature of the thermoplastic resin is not lower than any of the lower limits set forth above, softening of the thermoplastic resin contained in the insulating layer 3 can be inhibited in a temperature range in which an electrochemical device is normally used, and thus insulating performance of the short-circuit device 100 for an electrochemical device can be further improved. On the other hand, when the glass-transition temperature of the thermoplastic resin is not higher than any of the upper limits set forth above, the thermoplastic resin contained in the insulating layer 3 softens well in a situation in which the temperature at which an electrochemical device is normally used is exceeded, and thus short-circuiting performance of the short-circuit device 100 for an electrochemical device can be further improved.

Note that the "glass-transition temperature" referred to in the present disclosure can be measured by a method described in the EXAMPLES section of the present specification.

Moreover, in a situation in which a particulate polymer having a core-shell structure, for example, is used as the thermoplastic resin, it is preferable that the glass-transition temperature of at least one of a subsequently described polymer A forming a core portion and polymer B forming a shell portion is within any of the specific ranges set forth above, and more preferable that at least the glass-transition temperature of the polymer B forming the shell portion is within any of the specific ranges set forth above.

Although no specific limitations are placed on the form of the thermoplastic resin that is contained in the insulating layer 3, it is preferable that the thermoplastic resin has a particulate form. By using a particulate thermoplastic resin, it is possible to make the insulating layer 3 a porous insulating layer. This makes it possible to increase the reduction of volume of the insulating layer 3 that accompanies softening and melting of the thermoplastic resin in a situation in which the temperature at which an electrochemical device is normally used is exceeded and makes it easier for the first electrical conductor 1 and the porous conductive layer 4 to come into contact, which facilitates electrical connection of the first electrical conductor and the second electrical conductor, thus enabling further improvement of short-circuiting performance of the short-circuit device 100 for an electrochemical device.

In a case in which a particulate thermoplastic resin is used as the thermoplastic resin, the volume-average particle diameter of the particulate thermoplastic resin is preferably 1.0 μm or more, more preferably 2.5 μm or more, and even more preferably 5.0 μm or more, and is preferably 10.0 μm or less, more preferably 9.0 μm or less, and even more preferably 8.0 μm or less. When the volume-average particle diameter of the particulate thermoplastic resin is not less than any of the lower limits set forth above, short-circuiting performance of the short-circuit device 100 for an electrochemical device can be even further improved because it is possible to further increase the reduction of volume of the insulating layer 3 that accompanies softening and melting of the thermoplastic resin in a situation in which the temperature at which an electrochemical device is normally used is exceeded. On the other hand, when the volume-average particle diameter of the particulate thermoplastic resin is not more than any of the upper limits set forth above, strength of the insulating layer 3 can be improved and insulating performance of the short-circuit device 100 for an electrochemical device can be further improved through increased adhesiveness among the particulate thermoplastic resin in the insulating layer 3. Moreover, when the volume-average particle diameter of the particulate thermoplastic resin is not more than any of the upper limits set forth above, adhesiveness of the insulating layer 3 to other adjacent members (first electrical conductor 1 and porous conductive layer 4) can be improved.

Note that in the present disclosure, the "volume-average particle diameter" of a particulate thermoplastic resin other than a particulate polymer having a core-shell structure refers to the particle diameter (D50) at which, in a particle diameter distribution (by volume) measured by laser diffraction, cumulative volume calculated from a small diameter end of the distribution reaches 50%.

From a viewpoint of realizing high levels of both insulating performance and short-circuiting performance of the short-circuit device 100 for an electrochemical device, it is preferable that a particulate polymer having a core-shell structure is used as the above-described thermoplastic resin.

The following provides a detailed description of a particulate polymer having a core-shell structure that can suitably be used as the thermoplastic resin in the insulating layer 3.

[Particulate Polymer Having Core-Shell Structure]

The core-shell structure of the particulate polymer includes a core portion that is formed of a polymer A and a shell portion that is formed of a polymer B and that at least partially covers an outer surface of the core portion. The shell portion may completely cover the outer surface of the core portion or may partially cover the outer surface of the core portion.

In the particulate polymer having a core-shell structure, it is normally the case that the glass-transition temperature of the polymer A forming the core portion and the glass-transition temperature of the polymer B forming the shell portion differ, and it is preferably the case that the glass-transition temperature of the polymer B forming the shell portion is higher than the glass-transition temperature of the polymer A forming the core portion. When the glass-transition temperature of the polymer B forming the shell portion is higher than the glass-transition temperature of the polymer A forming the core portion in the particulate polymer having a core-shell structure, the polymer B forming the shell portion that has a high a glass-transition temperature increases the strength of the particulate polymer in a temperature range in which an electrochemical device is normally used, and thus can further improve insulating performance of the short-circuit device 100 for an electrochemical device, whereas the polymer A forming the core portion that has a low glass-transition temperature causes good softening of the particulate polymer in a situation in which a temperature range in which an electrochemical device is normally used is exceeded, and thus can further improve short-circuiting performance of the short-circuit device 100 for an electrochemical device.

Consequently, it is possible to realize even higher levels of both insulating performance and short-circuiting performance of the short-circuit device 100 for an electrochemical device.

—Glass-Transition Temperature of Polymer a Forming Core Portion—

The glass-transition temperature of the polymer A forming the core portion of the particulate polymer is preferably 10° C. or higher, more preferably 20° C. or higher, even more preferably 30° C. or higher, and particularly preferably 40° C. or higher, and is preferably 110° C. or lower, more preferably 90° C. or lower, and even more preferably 80° C. or lower. When the glass-transition temperature of the polymer A forming the core portion is not lower than any of the lower limits set forth above, softening of the particulate polymer having a core-shell structure that serves as the thermoplastic resin contained in the insulating layer 3 can be inhibited in a temperature range in which an electrochemical device is normally used, and thus insulating performance of the short-circuit device 100 for an electrochemical device can be further improved. On the other hand, when the glass-transition temperature of the polymer A forming the core portion is not higher than any of the upper limits set forth above, the particulate polymer having a core-shell structure that serves as the thermoplastic resin contained in the insulating layer 3 softens well in a situation in which the temperature at which an electrochemical device is normally used is exceeded, and thus short-circuiting performance of the short-circuit device 100 for an electrochemical device can be further improved. Note that the glass-transition temperature of the polymer A can be adjusted by altering the chemical composition of the polymer A.

—Chemical composition of polymer A forming core portion—

No specific limitations are placed on the chemical composition of the polymer A forming the core portion so long as the desired effects according to the present disclosure are obtained. For example, the polymer A forming the core portion may include a (meth)acrylic acid ester monomer unit, an aromatic vinyl monomer unit, and a cross-linkable monomer unit. Moreover, the polymer A forming the core portion may further include monomer units other than the aforementioned monomer units (i.e., other monomer units).

Note that when a polymer is said to "include a monomer unit" in the present specification, this means that "a polymer obtained using that monomer includes a structural unit derived from the monomer".

=(Meth)Acrylic Acid Ester Monomer Unit=

Examples of (meth)acrylic acid ester monomers that can form a (meth)acrylic acid ester monomer unit include acrylic acid alkyl esters such as methyl acrylate, ethyl acrylate, n-propyl acrylate, isopropyl acrylate, butyl acrylate (n-butyl acrylate, t-butyl acrylate, etc.), pentyl acrylate, hexyl acrylate, heptyl acrylate, octyl acrylate (2-ethylhexyl acrylate, etc.), nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, butyl methacrylate (n-butyl methacrylate, t-butyl methacrylate, etc.), pentyl methacrylate, hexyl methacrylate, heptyl methacrylate, octyl methacrylate (2-ethylhexyl methacrylate, etc.), nonyl methacrylate, decyl methacrylate, lauryl methacrylate, n-tetradecyl methacrylate, and stearyl methacrylate. Of these (meth)acrylic acid ester monomers, n-butyl acrylate, 2-ethylhexyl acrylate, and methyl methacrylate are preferable. Note that in the present specification, "(meth)acryl" is used to indicate "acryl" or "methacryl".

Also note that one of these (meth)acrylic acid ester monomers may be used individually, or two or more of these (meth)acrylic acid ester monomers may be used in combination in a freely selected ratio.

The proportional content of (meth)acrylic acid ester monomer units in the polymer A when all repeating units included in the polymer A are taken to be 100 mass % is preferably 10 mass % or more, and more preferably 15 mass % or more, and is preferably 80 mass % or less, and more preferably 75 mass % or less. When the proportional content of (meth)acrylic acid ester monomer units in the polymer A is not less than any of the lower limits set forth above, excessive lowering of the glass-transition temperature of the polymer A is inhibited, which can inhibit softening of the particulate polymer having a core-shell structure that serves as the thermoplastic resin contained in the insulating layer 3 in a temperature range in which an electrochemical device is normally used, and thus can further improve insulating performance of the short-circuit device 100 for an electrochemical device. When the proportional content of (meth) acrylic acid ester monomer units in the polymer A is not more than any of the upper limits set forth above, the particulate polymer having a core-shell structure that serves as the thermoplastic resin contained in the insulating layer 3 softens well in a situation in which the temperature at which an electrochemical device is normally used is exceeded, and thus short-circuiting performance of the short-circuit device 100 for an electrochemical device can be further improved.

=Aromatic Vinyl Monomer Unit=

Examples of aromatic vinyl monomers that can form an aromatic vinyl monomer unit include, but are not specifically limited to, styrene, α-methylstyrene, styrene sulfonic acid, butoxystyrene, and vinylnaphthalene, of which, styrene is preferable. Note that one of these aromatic vinyl monomers may be used individually, or two or more of these aromatic vinyl monomers may be used in combination in a freely selected ratio.

The proportional content of aromatic vinyl monomer units in the polymer A when all repeating units included in the polymer A are taken to be 100 mass % is preferably 20 mass % or more, and is preferably 90 mass % or less, and more preferably 85 mass % or less. When the proportional content of aromatic vinyl monomer units in the polymer A is within any of the specific ranges set forth above, strength of the insulating layer 3 can be increased and insulating performance of the short-circuit device 100 for an electrochemical device can be further improved due to increased adhesiveness among the particulate polymer having a core-shell structure that serves as the thermoplastic resin in the insulating layer 3. Moreover, when the proportional content of aromatic vinyl monomer units in the polymer A is within any of the specific ranges set forth above, adhesiveness of the insulating layer 3 to other adjacent members (first electrical conductor 1 and porous conductive layer 4) can be improved.

=Cross-Linkable Monomer Unit=

Examples of monomers that can form a cross-linkable monomer unit include polyfunctional monomers including at least two groups displaying polymerization reactivity. Examples of such polyfunctional monomers include divinyl compounds such as allyl methacrylate and divinylbenzene; di(meth)acrylic acid ester compounds such as diethylene glycol dimethacrylate, ethylene glycol dimethacrylate, diethylene glycol diacrylate, and 1,3-butylene glycol diacrylate; tri(meth)acrylic acid ester compounds such as trimethylolpropane trimethacrylate and trimethylolpropane triacrylate; and epoxy group-containing ethylenically unsaturated monomers such as allyl glycidyl ether and glycidyl methacrylate. One of these monomers may be used individually, or two or more of these monomers may be used in combination. Of these monomers, ethylene glycol dimethacrylate is preferable.

The proportional content of cross-linkable monomer units in the polymer A when all repeating units included in the polymer A are taken to be 100 mass % is preferably not less than 0.05 mass % and not more than 2 mass %. When the proportional content of cross-linkable monomer units in the polymer A is within the specific range set forth above, a suitable degree of heat resistance can be imparted to the polymer A, which makes it possible to realize even higher levels of both insulating performance and short-circuiting performance of the short-circuit device 100 for an electrochemical device.

=Other Monomer Units=

No specific limitations are placed on other monomer units, one example of which is a hydrophilic group-containing monomer unit.

Examples of hydrophilic group-containing monomers that can form a hydrophilic group-containing monomer unit include, but are not specifically limited to, carboxy group-containing monomers, sulfo group-containing monomers, phosphate group-containing monomers, and hydroxy group-containing monomers.

Moreover, examples of carboxy group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

Note that in the present specification, "(meth)allyl" is used to indicate "allyl" and/or "methallyl"

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present specification, "(meth)acryloyl" is used to indicate "acryloyl" and/or "methacryloyl".

Examples of hydroxy group-containing monomers include 2-hydroxyethyl acrylate, 2-hydroxypropyl acrylate, 2-hydroxyethyl methacrylate, and 2-hydroxypropyl methacrylate.

Note that one of these hydrophilic group-containing monomers may be used individually, or two or more of these hydrophilic group-containing monomers may be used in combination in a freely selected ratio.

The proportional content of other monomer units in the polymer A is not specifically limited, but when all repeating units included in the polymer A are taken to be 100 mass %, the proportional content of other monomer units is preferably 10 mass % or less, and may be 0 mass %. In other words, it may be the case that the polymer A does not include other monomer units.

—Glass-Transition Temperature of Polymer B Forming Shell Portion—

The glass-transition temperature of the polymer B forming the shell portion is preferably 60° C. or higher, more preferably 70° C. or higher, even more preferably 80° C. or higher, and further preferably 90° C. or higher, and is preferably 150° C. or lower, more preferably 120° C. or lower, and even more preferably 110° C. or lower. When the glass-transition temperature of the polymer B is not lower than any of the lower limits set forth above, softening of the particulate polymer having a core-shell structure that serves as the thermoplastic resin contained in the insulating layer 3 can be inhibited in a temperature range in which an electrochemical device is normally used, and thus insulating performance of the short-circuit device 100 for an electrochemical device can be further improved. On the other hand, when the glass-transition temperature of the polymer B is not higher than any of the upper limits set forth above, the particulate polymer having a core-shell structure that serves as the thermoplastic resin contained in the insulating layer 3 softens well in a situation in which the temperature at which an electrochemical device is normally used is exceeded, and thus short-circuiting performance of the short-circuit device 100 for an electrochemical device can be further improved.

Note that the glass-transition temperature of the polymer B can be adjusted by altering the chemical composition of the polymer B. More specifically, the glass-transition temperature of the polymer B can be raised by, for example, increasing the amount of a cross-linkable monomer that is used in production of the polymer B.

—Chemical Composition of Polymer B Forming Shell Portion—

No specific limitations are placed on the chemical composition of the polymer B forming the shell portion so long as the desired effects according to the present disclosure are obtained. For example, it is preferable that the polymer B forming the shell portion includes either or both of an aromatic vinyl monomer unit and a nitrile group-containing monomer unit. When the polymer B forming the shell portion includes either or both of an aromatic vinyl monomer unit and a nitrile group-containing monomer unit, strength of the insulating layer 3 can be increased and insulating performance of the short-circuit device 100 for an electrochemical device can be further improved due to increased adhesiveness among the particulate polymer having a core-shell structure that serves as the thermoplastic resin in the insulating layer 3. From a viewpoint of further enhancing this effect, it is preferable that the polymer B forming the shell portion includes both an aromatic vinyl monomer unit and a nitrile group-containing monomer unit. Moreover, the polymer B forming the shell portion may further include a (meth)acrylic acid ester monomer unit and a cross-linkable monomer unit in addition to an aromatic vinyl monomer unit and a nitrile group-containing monomer unit. Furthermore, the polymer B forming the shell portion may further include monomer units other than the aforementioned monomer units (i.e., other monomer units).

=Aromatic Vinyl Monomer Unit=

Any of the aromatic vinyl monomers that were previously described in the "Chemical composition of polymer A forming core portion" section can be used as an aromatic vinyl monomer that can form an aromatic vinyl monomer unit. Of these aromatic vinyl monomers, styrene is preferable.

In a case in which the polymer B includes an aromatic vinyl monomer unit, the proportional content of aromatic vinyl monomer units in the polymer B when all repeating units included in the polymer B are taken to be 100 mass % is preferably 30 mass % or more, and more preferably 45 mass % or more, and is preferably 80 mass % or less, and more preferably 70 mass % or less. When the proportional content of aromatic vinyl monomer units in the polymer B is within any of the specific ranges set forth above, it is possible to realize even higher levels of both insulating performance and short-circuiting performance of the short-circuit device 100 for an electrochemical device.

=Nitrile Group-Containing Monomer Unit=

Examples of nitrile group-containing monomers that can form a nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these nitrile group-containing monomers, acrylonitrile is preferable.

Note that one of these nitrile group-containing monomers may be used individually, or two or more of these nitrile group-containing monomers may be used in combination in a freely selected ratio.

In a case in which the polymer B includes a nitrile group-containing monomer unit, the proportional content of nitrile group-containing monomer units in the polymer B when all repeating units included in the polymer B are taken to be 100 mass % is preferably 5 mass % or more, more preferably 10 mass % or more, and even more preferably 20 mass % or more, and is preferably 60 mass % or less, and more preferably 50 mass % or less. When the proportional content of nitrile group-containing monomer units in the polymer B is within any of the specific ranges set forth above, it is possible to realize even higher levels of both insulating performance and short-circuiting performance of the short-circuit device 100 for an electrochemical device.

The total proportional content of aromatic vinyl monomer units and nitrile group-containing monomer units in the polymer B when all repeating units included in the polymer B are taken to be 100 mass % is preferably 5 mass % or more, and more preferably 10 mass % or more, and is preferably 95 mass % or less, and more preferably 90 mass % or less. When the total proportional content of aromatic vinyl monomer units and nitrile group-containing monomer units in the polymer B is within any of the specific ranges set forth above, it is possible to realize even higher levels of both insulating performance and short-circuiting performance of the short-circuit device 100 for an electrochemical device.

=(Meth)Acrylic Acid Ester Monomer Unit=

Any of the (meth)acrylic acid ester monomers that were previously described in the "Chemical composition of polymer A forming core portion" section can be used as a (meth)acrylic acid ester monomer that can form a (meth)acrylic acid ester monomer unit. Of these (meth)acrylic acid ester monomers, n-butyl acrylate and methyl methacrylate are preferable.

The proportional content of (meth)acrylic acid ester monomer units in the polymer B when all repeating units included in the polymer B are taken to be 100 mass % is preferably 5 mass % or more, and more preferably 10 mass % or more, and is preferably 95 mass % or less, and more preferably 90 mass % or less. When the proportional content of (meth)acrylic acid ester monomer units in the polymer B is not less than any of the lower limits set forth above, excessive lowering of the glass-transition temperature of the polymer B is inhibited, which can inhibit softening of the particulate polymer having a core-shell structure that serves as the thermoplastic resin contained in the insulating layer 3 in a temperature range in which an electrochemical device is normally used, and thus can further improve insulating performance of the short-circuit device 100 for an electrochemical device. On the other hand, when the proportional content of (meth)acrylic acid ester monomer units in the polymer B is not more than any of the upper limits set forth above, the particulate polymer having a core-shell structure that serves as the thermoplastic resin contained in the insulating layer 3 softens well in a situation in which the temperature at which an electrochemical device is normally used is exceeded, and thus short-circuiting performance of the short-circuit device 100 for an electrochemical device can be further improved. Moreover, when the proportional content of (meth)acrylic acid ester monomer units in the polymer B is not more than any of the upper limits set forth above, adhesiveness of the insulating layer 3 to other adjacent members (first electrical conductor 1 and porous conductive layer 4) can be improved.

=Cross-Linkable Monomer Unit=

Any of the cross-linkable monomers that were previously described in the "Chemical composition of polymer A forming core portion" section can be used as a cross-linkable monomer that can form a cross-linkable monomer unit. Of these cross-linkable monomers, ethylene glycol dimethacrylate is preferable.

The proportional content of cross-linkable monomer units in the polymer B when all repeating units included in the polymer B are taken to be 100 mass % is preferably 0.1 mass % or more, and is preferably 5 mass % or less, and more preferably 2 mass % or less. When the proportional content of cross-linkable monomer units in the polymer B is within any of the specific ranges set forth above, a suitable degree of heat resistance can be imparted to the polymer B, which makes it possible to realize even higher levels of both insulating performance and short-circuiting performance of the short-circuit device 100 for an electrochemical device.

=Other Monomer Units=

No specific limitations are placed on other monomers that can form other monomers units. For example, any of the hydrophilic group-containing monomers that were previously described in the "Chemical composition of polymer A forming core portion" section can be used.

The proportional content of other monomer units in the polymer B is not specifically limited, but when all repeating units included in the polymer B are taken to be 100 mass %, the proportional content of other monomer units is preferably 10 mass % or less, and may be 0 mass %. In other words, it may be the case that the polymer B does not include other monomer units.

—Mass Ratio of Core Portion and Shell Portion—

The mass ratio of the core portion and the shell portion (core portion/shell portion) in the particulate polymer having a core-shell structure is preferably 999/1 or less, more preferably 99/1 or less, even more preferably 95/5 or less, and particularly preferably 90/10 or less, and is preferably 50/50 or more, more preferably 55/45 or more, even more preferably 60/40 or more, and particularly preferably 65/35 or more. When the mass ratio of the core portion and the shell portion (core portion/shell portion) in the particulate polymer having a core-shell structure is within any of the specific ranges set forth above, it is possible to realize even higher levels of both insulating performance and short-circuiting performance of the short-circuit device 100 for an electrochemical device.

—Production of Particulate Polymer Having Core-Shell Structure—

The particulate polymer having a core-shell structure can be produced through polymerization of a monomer composition that contains the monomers described above, carried out in an aqueous solvent such as water, for example.

The method of polymerization is not specifically limited and may be a suspension polymerization method, an emulsion polymerization and aggregation method, a pulverization method, or the like. In particular, from a viewpoint of convenience and cost effectiveness, a suspension polymerization method and an emulsion polymerization and aggregation method are preferable, and a suspension polymerization method is more preferable. Moreover, a reaction such as radical polymerization or living radical polymerization can be adopted as the polymerization reaction.

Furthermore, other compounding agents such as chain transfer agents, polymerization modifiers, polymerization reaction retardants, reactive fluidizers, fillers, flame retardants, antioxidants, and colorants can be compounded in any amount in the monomer composition that is used in production of the particulate polymer having a core-shell structure.

The following describes, as one example, a production method in which the particulate polymer having a core-shell structure is produced by suspension polymerization.

=Production of Particulate Polymer Having Core-Shell Structure by Suspension Polymerization=

(1) Production of Monomer Composition

First, a monomer composition (A) having a chemical composition corresponding to the chemical composition of the polymer A forming the core portion and a monomer composition (B) having a chemical composition corresponding to the chemical composition of the polymer B forming the shell portion are each prepared. In this preparation, various monomers are compounded in accordance with the chemical compositions of the polymer A and the polymer B, and other compounding agents that can be added as necessary are further mixed therewith.

Note that the proportional content of each monomer in the monomer composition (A) is normally the same as the proportional content of each monomer unit in the polymer A forming the core portion, and the proportional content of each monomer in the monomer composition (B) is normally the same as the proportional content of each monomer unit in the polymer B forming the shell portion.

(2) Formation of Droplets

Next, the monomer composition (A) is dispersed in water, a polymerization initiator is added, and then droplets of the monomer composition (A) are formed. No specific limitations are placed on the method by which droplets are formed. For example, the droplets can be formed by using a disperser such as an emulsifying/dispersing device to perform shear stirring of the water containing the monomer composition (A).

The polymerization initiator that is used at this time may be an oil-soluble polymerization initiator such as t-butyl peroxy-2-ethylhexanoate or azobisisobutyronitrile. Note that the polymerization initiator may be added prior to droplet formation once the monomer composition (A) has been dispersed in water or may be added to the monomer composition (A) prior to the monomer composition (A) being dispersed in water.

From a viewpoint of stabilizing droplets of the monomer composition (A) that are formed in the water, it is preferable that droplets of the monomer composition (A) are formed after adding a dispersion stabilizer to the water. The dispersion stabilizer may be sodium dodecylbenzenesulfonate, a metal hydroxide such as magnesium hydroxide, or the like, for example.

(3) Polymerization

After formation of droplets of the monomer composition (A), water containing the formed droplets is heated to initiate polymerization. At a stage at which the polymerization conversion rate has sufficiently increased, the monomer composition (B) is added, and polymerization is continued to form a particulate polymer having a core-shell structure in the water. The reaction temperature of the polymerization is preferably not lower than 50° C. and not higher than 95° C. Moreover, the reaction time of the polymerization is preferably not less than 1 hour and not more than 10 hours, and is preferably 8 hours or less, and more preferably 6 hours or less.

(4) Washing, Filtration, Dehydration, and Drying Step

After the polymerization has ended, the particulate polymer having a core-shell structure can be obtained by performing washing, filtration, and drying of the water containing the particulate polymer by standard methods.

In this example, the core-shell structure is formed through continuous addition of the monomer composition (B) to the same polymerization system as the monomer composition (A) in step (3) described above (i.e., the core-shell structure is formed through subsequent monomer addition). However, the production method of the particulate polymer having a core-shell structure is not limited to the example described above. For example, the monomer composition (B) may first be polymerized to obtain the polymer B, the polymer B may subsequently be dissolved in a solution containing the monomer composition (A), a step may then be performed in the same way as described above in (2) to form droplets containing the polymer B and the monomer composition (A), and water containing the formed droplets may subsequently be heated to initiate polymerization. The polymerization conditions during the above can be set as the same conditions as described above for step (3). By then performing a step in the same way as step (4) described above, and causing phase separation of the polymer B to form a shell portion during this step, it is possible to obtain a particulate polymer having a core-shell structure (i.e., the core-shell structure is formed through phase separation). Note that polyvinyl alcohol or the like can be added as a dispersion stabilizer when polymerizing the monomer composition (B) to obtain the polymer B.

Of these production methods, the former method in which "the core-shell structure is formed through continuous addition of the monomer composition (B) to the same polymerization system as the monomer composition (A) in step (3)" is preferable from a viewpoint of convenience.

Note that the mass ratio of the monomer composition (A) and the monomer composition (B) can be set as appropriate such as to satisfy the previously described "mass ratio of the core portion and the shell portion" in the particulate polymer having a core-shell structure.

—Volume-Average Particle Diameter of Particulate Polymer Having Core-Shell Structure—

The volume-average particle diameter of the particulate polymer having a core-shell structure can be adjusted within any of the same ranges as the preferred ranges for the volume-average particle diameter of the particulate thermoplastic resin that were previously described.

Note that the "volume-average particle diameter" of the particulate polymer having a core-shell structure can be measured by a method described in the EXAMPLES section of the present specification.

Moreover, the volume-average particle diameter of the particulate polymer having a core-shell structure can be adjusted through the type or amount of a metal hydroxide that is used in production of the particulate polymer, for example.

—Particle Diameter Distribution of Particulate Polymer Having Core-Shell Structure—

The particle diameter distribution of the particulate polymer having a core-shell structure is preferably 1.5 or less, and more preferably 1.3 or less. When the particle diameter distribution of the particulate polymer having a core-shell structure is not more than any of the specific values set forth above, variation of thickness of the insulating layer 3 can be reduced.

Note that the "particle diameter distribution" of the particulate polymer having a core-shell structure can be measured by a method described in the EXAMPLES section of the present specification.

<<Binder>>

The insulating layer 3 may further contain a binder in addition to the thermoplastic resin described above.

The binder is a material that in a case in which a particulate thermoplastic resin is used as the previously described thermoplastic resin, for example, can bind the particulate thermoplastic resin together. The binder also has a function of adhering the insulating layer 3 to other adjacent members (first electrical conductor and porous conductive layer 4).

The binder may be any known polymer that can be used as a binder. For example, the binder may be a water-insoluble polymer such as a conjugated diene polymer, an acrylic polymer, or polyvinylidene fluoride (PVDF); or a water-soluble polymer such as polyvinyl alcohol (PVOH). One binder may be used individually, or two or more binders may be used in combination. The binder is preferably a polymer such as a conjugated diene polymer, an acrylic polymer, or polyvinylidene fluoride (PVDF) that is water-insoluble and that can be dispersed in a dispersion medium such as water, is more preferably a conjugated diene polymer or an acrylic polymer, and is even more preferably an acrylic polymer.

When a polymer is said to be "water-insoluble" in the present disclosure, this means that when 0.5 g (in terms of solid content) of the polymer is dissolved in 100 g of water at a temperature of 25° C., insoluble content is 90 mass % or more.

Moreover, when a polymer is said to be "water-soluble" in the present disclosure, this means that when 0.5 g (in terms of solid content) of the polymer is dissolved in 100 g of water at a temperature of 25° C., insoluble content is less than 1.0 mass %.

The term "conjugated diene polymer" refers to a polymer that includes a conjugated diene monomer unit. Specific examples of the conjugated diene polymer include, but are not specifically limited to, a copolymer including an aromatic vinyl monomer unit and an aliphatic conjugated diene monomer unit such as a styrene-butadiene copolymer (SBR); butadiene rubber (BR); acrylic rubber (NBR) (copolymer including an acrylonitrile unit and a butadiene unit); and hydrogenated products thereof.

The term "acrylic polymer" refers to a polymer that includes a (meth)acrylic acid ester monomer unit.

Note that one of these binders may be used individually, or two or more of these binders may be used in combination in a freely selected ratio.

Also note that the polymer used as the binder is considered to be a different component to the previously described thermoplastic resin.

An acrylic polymer that can preferably be used as the binder may be a polymer that includes a cross-linkable monomer unit, a (meth)acrylic acid ester monomer unit, and a hydrophilic group-containing monomer unit, for example, but is not specifically limited thereto.

Various monomers that were previously described in the "Chemical composition of polymer A forming core portion" section in relation to the particulate polymer having a core-shell structure can be used as various monomers that can form a cross-linkable monomer unit, a (meth)acrylic acid ester monomer unit, and a hydrophilic group-containing monomer unit.

The proportional content of (meth)acrylic acid ester monomer units in the acrylic polymer is preferably 50 mass % or more, more preferably 55 mass % or more, and even more preferably 58 mass % or more, and is preferably 98 mass % or less, more preferably 97 mass % or less, and even more preferably 96 mass % or less. By setting the proportional content of (meth)acrylic acid ester monomer units in the acrylic polymer as not less than any of the lower limits set forth above, it is possible to further improve insulating performance of the short-circuit device 100 for an electrochemical device due to increased adhesiveness among the thermoplastic resin in the insulating layer 3 and improved strength of the insulating layer 3. Moreover, by setting the proportional content of (meth)acrylic acid ester monomer units in the acrylic polymer as not less than any of the lower limits set forth above, it is also possible to improve adhesiveness of the insulating layer 3 to other adjacent members (first electrical conductor and porous conductive layer 4). On the other hand, by setting the proportional content of (meth) acrylic acid ester monomer units in the acrylic polymer as not more than any of the upper limits set forth above, it is possible to inhibit excessive increase of strength of the insulating layer 3 and ensure sufficiently high short-circuiting performance of the short-circuit device 100 for an electrochemical device.

The proportional content of cross-linkable monomer units in the acrylic polymer is preferably 0.1 mass % or more, and more preferably 1.0 mass % or more, and is preferably 3.0 mass % or less, and more preferably 2.5 mass % or less. By setting the proportional content of cross-linkable monomer units in the acrylic polymer within any of the specific ranges set forth above, strength of the insulating layer 3 can be appropriately adjusted, which makes it possible to realize even higher levels of both insulating performance and short-circuiting performance of the short-circuit device 100 for an electrochemical device.

The proportion constituted by hydrophilic group-containing monomer units in the acrylic polymer is preferably 0.1 mass % or more, more preferably 0.3 mass % or more, and even more preferably 0.5 mass % or more, and is preferably 20 mass % or less, more preferably 10 mass % or less, and even more preferably 5 mass % or less. By setting the proportion constituted by hydrophilic group-containing monomer units in the acrylic polymer as not less than any of the lower limits set forth above, it is possible to further improve insulating performance of the short-circuit device 100 for an electrochemical device due to increased adhesiveness among the thermoplastic resin in the insulating layer 3 and improved strength of the insulating layer 3. Moreover, by setting the proportion constituted by hydrophilic group-containing monomer units in the acrylic polymer as not less than any of the lower limits set forth above, it is also possible to improve adhesiveness of the insulating layer 3 to other adjacent members (first electrical conductor and porous conductive layer 4). On the other hand, by setting the proportional content of hydrophilic group-containing monomer units in the acrylic polymer as not more than any of the upper limits set forth above, it is possible to inhibit excessive increase of strength of the insulating layer 3 and ensure sufficiently high short-circuiting performance of the short-circuit device 100 for an electrochemical device.

Note that the acrylic polymer may further include monomer units other than the above-described monomer units.

[Glass-Transition Temperature of Binder]

The glass-transition temperature (Tg) of the binder is preferably −100° C. or higher, more preferably −90° C. or higher, even more preferably −80° C. or higher, and further preferably −40° C. or higher, and is preferably 40° C. or lower, more preferably 30° C. or lower, even more preferably 20° C. or lower, and further preferably 15° C. or lower. When the glass-transition temperature of the binder is not lower than any of the lower limits set forth above, insulating performance of the short-circuit device 100 for an electrochemical device can be further improved due to increased adhesiveness among the thermoplastic resin in the insulating layer 3 and improved strength of the insulating layer 3. Moreover, when the glass-transition temperature of the binder is not lower than any of the lower limits set forth above, adhesiveness of the insulating layer 3 to other adjacent members (first electrical conductor and porous conductive layer 4) can also be improved. On the other hand, when the glass-transition temperature of the binder is not higher than any of the upper limits set forth above, excessive increase of strength of the insulating layer 3 can be inhibited, and sufficiently high short-circuiting performance of the short-circuit device 100 for an electrochemical device can be ensured.

[Production Method of Binder]

No specific limitations are placed on the method by which the binder is produced. For example, an acrylic polymer serving as the binder can be produced through polymerization of a monomer composition containing the various monomers described above, carried out in an aqueous solvent such as water, for example. The proportion constituted by each type of monomer in the monomer composition is normally set as the same as the proportional content of each type of monomer unit in the acrylic polymer serving as the binder.

No specific limitations are placed on the polymerization method and the polymerization reaction in production of the acrylic polymer serving as the binder. For example, any of the polymerization methods and polymerization reactions that were previously described in the "Production of particulate polymer having core-shell structure" section can be adopted.

[Form of Binder]

Although the binder may have a particulate form or may have a non-particulate form, it is preferable that the binder has a particulate form from a viewpoint of good inhibition of shedding of components contained in the insulating layer 3.

Note that in a case in which a particulate polymer is used as the binder, the particulate polymer is normally a particulate polymer that does not have a core-shell structure, but is not specifically limited thereto.

[Volume-Average Particle Diameter of Particulate Binder]

In a case in which a particulate binder is used as the binder, the volume-average particle diameter of the particulate binder is not specifically limited, but may be 0.05 μm or more, may be 0.10 μm or more, or may be 0.20 μm or more, for example, and may be 1.00 μm or less, may be 0.80 μm or less, or may be 0.50 μm or less, for example.

Note that in the present disclosure, the "volume-average particle diameter" of a particulate binder refers to the particle diameter D50 at which, in a particle diameter distribution (by volume) measured by laser diffraction, cumulative volume calculated from a small diameter end of the distribution reaches 50%.

[Content of Binder]

The content of the binder in the insulating layer 3 is preferably 0.1 parts by mass or more, more preferably 0.2 parts by mass or more, even more preferably 0.5 parts by mass or more, further preferably 1 part by mass or more, and even further preferably 2 parts by mass or more relative to 100 parts by mass of the previously described thermoplastic resin, and is preferably 20 parts by mass or less, more preferably 15 parts by mass or less, and even more preferably 10 parts by mass or less relative to 100 parts by mass of the previously described thermoplastic resin. When the content of the binder in the insulating layer 3 is not less than any of the lower limits set forth above, insulating performance of the short-circuit device 100 for an electrochemical device can be further improved due to increased adhesiveness among the thermoplastic resin in the insulating layer 3 and improved strength of the insulating layer 3. Moreover, when the content of the binder in the insulating layer 3 is not less than any of the lower limits set forth above, adhesiveness of the insulating layer 3 to other adjacent members (first electrical conductor and porous conductive layer 4) can also be improved. On the other hand, when the content of the binder in the insulating layer 3 is not more than any of the upper limits set forth above, excessive increase of strength of the insulating layer 3 can be inhibited, and sufficiently high short-circuiting performance of the short-circuit device 100 for an electrochemical device can be ensured.

<<Thickener>>

The insulating layer 3 may further contain a thickener in addition to the thermoplastic resin and binder described above. The thickener is a component that can be used in order to improve coatability of a slurry composition for an insulating layer that is used in a subsequently described formation method of the insulating layer 3.

Known thickeners can be used as the thickener without any specific limitations. For example, carboxymethyl cellulose or a salt thereof can be used as the thickener.

[Content of Thickener]

The content of the thickener in the insulating layer 3 is preferably 0.1 parts by mass or more, more preferably 0.2 parts by mass or more, even more preferably 0.5 parts by mass or more, and further preferably 1 part by mass or more relative to 100 parts by mass of the previously described thermoplastic resin, and is preferably 10 parts by mass or less, more preferably 5 parts by mass or less, and even more preferably 2 parts by mass or less relative to 100 parts by mass of the previously described thermoplastic resin. When the content of the thickener in the insulating layer 3 is within any of the specific ranges set forth above, variation of thickness of the insulating layer 3 can be reduced by imparting good coatability to a slurry composition for an insulating layer.

<<Formation Method of Insulating Layer 3>>

No specific limitations are placed on the method by which the insulating layer 3 is formed. For example, the insulating layer 3 can be formed through application and drying, on a substrate, of a slurry composition for an insulating layer having the previously described thermoplastic resin, binder, thickener, etc. dispersed in a dispersion medium such as water.

The slurry composition for an insulating layer can be produced by mixing the previously described thermoplastic resin, binder, and thickener with water or the like serving as a dispersion medium by a known method, for example, without any specific limitations. In a situation in which a dispersion liquid having the binder dispersed in a dispersion medium such as water is used in production of the slurry composition for an insulating layer, the dispersion medium such as water that is contained in the water dispersion can be used as the dispersion medium of the slurry composition for an insulating layer.

The solid content concentration of the slurry composition for an insulating layer is preferably 10 mass % or more, more preferably 20 mass % or more, and even more preferably 25 mass % or more, and is preferably 50 mass % or less, more preferably 40 mass % or less, and even more preferably 35 mass % or less. When the solid content concentration of the slurry composition for an insulating layer is not less than any of the lower limits set forth above, production efficiency of the short-circuit device 100 for an electrochemical device can be improved because it is easy to dry the slurry composition for an insulating layer that has been applied onto the substrate. Moreover, when the solid content concentration of the slurry composition for an insulating layer is within any of the specific ranges set forth above, variation of thickness of the insulating layer 3 can be reduced due to increased coatability of the slurry composition for an insulating layer that is used to form the insulating layer 3, and production efficiency of the short-circuit device 100 for an electrochemical device can be improved.

No specific limitations are placed on the substrate onto which the slurry composition for an insulating layer is applied. For example, the slurry composition for an insulating layer may be applied onto one surface of the first electrical conductor 1 as a substrate, or the slurry composition for an insulating layer may be applied onto the surface of a substrate having the porous conductive layer 4 formed on the second electrical conductor 2, at a side of the substrate corresponding to the porous conductive layer 4.

The coating weight of the slurry composition for an insulating layer on the substrate can be adjusted as appropriate such that the area density of the formed insulating layer 3 exceeds the previously described specific value and satisfies the previously described specific relationship formula with the subsequently described porous conductive layer 4.

Drying of the slurry composition for an insulating layer that has been applied onto the substrate can be performed by any known drying method without any specific limitations.

<Porous Conductive Layer 4>

The porous conductive layer 4 is a layer that is porous and electrically conductive. Moreover, the porous conductive layer 4 normally contains a conductive material and may further contain components other than the conductive material to the extent that the desired effects according to the present disclosure are obtained. Examples of components other than the conductive material include a binder, a thickener, and so forth.

<<Conductive Material>>

The conductive material that can be contained in the porous conductive layer 4 is not specifically limited so long as it is a material that is electrically conductive and that can form a porous structure in the porous conductive layer 4.

From a viewpoint of forming a good porous structure in the porous conductive layer 4, it is preferable to use a particulate conductive material or a fibrous conductive material as the conductive material, and more preferable to use a particulate conductive material as the conductive material.

For example, carbon materials and metal materials can be used as the conductive material.

More specifically, examples of conductive materials that can be used include particulate carbon materials such as carbon black (for example, acetylene black, Ketjenblack® (Ketjenblack is a registered trademark in Japan, other countries, or both), and furnace black); fibrous carbon materials such as carbon nanotubes (for example, single-walled carbon nanotubes and multi-walled carbon nanotubes), carbon nanohorns, milled carbon fiber obtained through pyrolysis and subsequent pulverization of polymer fiber, graphene (for example, single-layer graphene or multi-layer graphene), and carbon non-woven fabric sheet obtained through pyrolysis of non-woven fabric formed of polymer fiber; particulate metal materials such as various types of metal particles; and fibrous metal materials such as various types of metal fiber.

Multi-walled carbon nanotubes are considered to be inclusive of cup-stacked carbon nanotubes.

Note that one of these conductive materials may be used individually, or two or more of these conductive materials may be used in combination in a freely selected ratio.

In particular, from a viewpoint of further improving short-circuiting performance of the short-circuit device 100 for an electrochemical device through formation of a good porous structure in the porous conductive layer 4, it is preferable to use a carbon material, and more preferable to use a particulate carbon material or a fibrous carbon material as the conductive material.

In a case in which a particulate conductive material such as carbon black is used as the conductive material, the particle diameter of the particulate conductive material is not specifically limited and can be adjusted as appropriate to the extent that the desired effects according to the present disclosure are obtained.

Moreover, in a case in which a fibrous conductive material such as carbon nanotubes is used as the conductive material, the diameter and length of the fibrous conductive material are not specifically limited and can be adjusted as appropriate to the extent that the desired effects according to the present disclosure are obtained.

The average diameter of a fibrous conductive material such as carbon nanotubes is preferably 0.5 nm or more, more preferably 1 nm or more, and even more preferably 2 nm or more, and is preferably 50 nm or less, more preferably 40 nm or less, and even more preferably 20 nm or less.

The average length of a fibrous conductive material such as carbon nanotubes is preferably 1 μm or more, more preferably 3 μm or more, and even more preferably 5 μm or more, and is preferably 40 μm or less, more preferably 30 μm or less, and even more preferably 20 μm or less.

When the average diameter and the average length of a fibrous conductive material such as carbon nanotubes are not less than any of the lower limits set forth above, aggregation of the fibrous conductive material can be sufficiently inhibited, and dispersibility of the fibrous conductive material in a slurry composition for a porous conductive layer used in a subsequently described formation method of the porous conductive layer 4, for example, can be sufficiently ensured. This makes it possible to further improve short-circuiting performance of the short-circuit device 100 for an electrochemical device because a uniform porous conductive layer 4 can be formed. On the other hand, when the average diameter and the average length of a fibrous conductive material such as carbon nanotubes are not more than any of the upper limits set forth above, short-circuiting performance of the short-circuit device 100 for an electrochemical device can be further improved because good electrical conduction paths can be formed in the porous conductive layer 4.

Note that the "average diameter" and "average length" of a fibrous conductive material such as carbon nanotubes can be determined by measuring the diameters (external diameters) and lengths of 100 randomly selected fibers of the fibrous conductive material using a TEM.

<<Binder>>

The porous conductive layer 4 may further contain a binder in addition to the conductive material described above.

The binder is a material that can bind the conductive material together and that can adhere the porous conductive layer 4 to other adjacent members (second electrical conductor and insulating layer 3).

Note that the binder that can be contained in the porous conductive layer 4 may be the same as any of the previously described binders that can be contained in the insulating layer 3.

—Content of Binder—

The content of the binder in the porous conductive layer 4 is preferably 0.1 parts by mass or more, more preferably 0.2 parts by mass or more, even more preferably 0.5 parts by mass or more, further preferably 1 part by mass or more, and even further preferably 2 parts by mass or more relative to 100 parts by mass of the previously described conductive material, and is preferably 20 parts by mass or less, more preferably 15 parts by mass or less, and even more preferably 10 parts by mass or less relative to 100 parts by mass of the previously described conductive material. When the content of the binder in the porous conductive layer 4 is not less than any of the lower limits set forth above, strength of the porous conductive layer 4 is improved to a suitable degree, and a good porous structure is maintained, which makes it easier for the softened thermoplastic resin that is a constituent of the insulating layer 3 to infiltrate the porous structure in a situation in which the temperature at which an electrochemical device is normally used is exceeded. Consequently, it becomes easier for the porous conductive layer 4 and the first electrical conductor that is adjacent to the insulating layer 3 to come into contact, and thus short-circuiting performance of the short-circuit device 100 for an electrochemical device can be further improved. On the other hand, when the content of the binder in the porous conductive layer 4 is not more than any of the upper limits set forth above, sufficiently high short-circuiting performance of the short-circuit device 100 for an electrochemical device can be ensured because reduction of electrical conductivity of the porous conductive layer 4 due to an excessive amount of the binder can be inhibited.

<<Thickener>>

The porous conductive layer 4 may further contain a thickener in addition to the conductive material and binder described above. The thickener is a component that can be used in order to improve coatability of a slurry composition for a porous conductive layer that is used in a subsequently described formation method of the porous conductive layer 4.

The thickener may be the same as any of the previously described thickeners that can be contained in the insulating layer 3, such as carboxymethyl cellulose or a salt thereof, for example.

—Content of Thickener—

The content of the thickener in the porous conductive layer 4 is preferably 0.1 parts by mass or more, more preferably 0.2 parts by mass or more, even more preferably 0.5 parts by mass or more, and further preferably 1 part by mass or more relative to 100 parts by mass of the previously described conductive material, and is preferably 10 parts by mass or less, more preferably 6 parts by mass or less, and even more preferably 4 parts by mass or less relative to 100 parts by mass of the previously described conductive material. When the content of the thickener in the porous conductive layer 4 is within any of the specific ranges set forth above, variation of thickness of the porous conductive layer 4 can be reduced through good coatability being imparted to a slurry composition for a porous conductive layer that is used in formation of the porous conductive layer 4. Moreover, when the content of the thickener in the porous conductive layer 4 is not more than any of the upper limits set forth above, sufficiently high short-circuiting performance of the short-circuit device 100 for an electrochemical device can be ensured because reduction of electrical conductivity of the porous conductive layer 4 due to an excessive amount of the thickener can be inhibited.

<<Formation Method of Porous Conductive Layer 4>>

No specific limitations are placed on the method by which the porous conductive layer 4 is formed. For example, the porous conductive layer 4 can be formed through application and drying, on a substrate, of a slurry composition for a porous conductive layer having the previously described conductive material, binder, thickener, etc. dispersed in a dispersion medium such as water.

The slurry composition for a porous conductive layer can be produced by mixing the previously described conductive material, binder, and thickener with water or the like serving as a dispersion medium by a known method, for example, without any specific limitations. In a situation in which a dispersion liquid having the binder dispersed in a dispersion medium such as water is used in production of the slurry composition for a porous conductive layer, the dispersion medium such as water that is contained in the water dispersion can be used as the dispersion medium of the slurry composition for a porous conductive layer.

The solid content concentration of the slurry composition for a porous conductive layer is preferably 10 mass % or more, more preferably 20 mass % or more, and even more preferably 25 mass % or more, and is preferably 50 mass % or less, more preferably 40 mass % or less, and even more preferably 35 mass % or less. When the solid content concentration of the slurry composition for a porous conductive layer is not less than any of the lower limits set forth above, production efficiency of the short-circuit device 100 for an electrochemical device can be improved because it is easy to dry the slurry composition for porous conductive layer that has been applied onto the substrate. Moreover, when the solid content concentration of the slurry composition for a porous conductive layer is within any of the specific ranges set forth above, variation of thickness of the porous conductive layer 4 can be reduced due to increased coatability of the slurry composition for a porous conductive layer that is used to form the porous conductive layer 4, and production efficiency of the short-circuit device 100 for an electrochemical device can be improved.

No specific limitations are placed on the substrate onto which the slurry composition for a porous conductive layer is applied. For example, the slurry composition for a porous conductive layer may be applied onto one surface of the second electrical conductor 2 as a substrate, or the slurry composition for a porous conductive layer may be applied onto the surface of a substrate having the insulating layer 3 formed on the first electrical conductor 1, at a side of the substrate corresponding to the insulating layer 3.

The coating weight of the slurry composition for a porous conductive layer on the substrate can be adjusted as appropriate such that the area density of the formed porous conductive layer 4 satisfies the specific relationship formula with the previously described insulating layer 3.

Drying of the slurry composition for a porous conductive layer that has been applied onto the substrate can be performed by any known drying method without any specific limitations.

<<Other Members, Etc.>>

The short-circuit device 100 for an electrochemical device may further include constituent members other than the first electrical conductor 1, second electrical conductor 2, insulating layer 3, and porous conductive layer 4 described above (i.e., other members) to the extent that the desired effects according to the present disclosure are obtained.

Examples of such other members include a protective container that at least partially covers a laminate including the previously described first electrical conductor 1, second electrical conductor 2, insulating layer 3, and porous conductive layer 4.

Moreover, the short-circuit device 100 for an electrochemical device may further include a member applying external force such as a spring, a clip, or an expansion member. The term "external force" refers to force in a direction in which the first electrical conductor 1 and the second electrical conductor 2 move closer together with the insulating layer 3 and the porous conductive layer 4 in-between.

However, as previously described, the short-circuit device 100 for an electrochemical device has both insulating performance and short-circuiting performance and can function well as a short-circuit device for an electrochemical device without the need for a member applying external force, and thus normally does not include a member applying external force.

In a modified example of the short-circuit device 100 for an electrochemical device, the short-circuit device 100 for an electrochemical device can further include an insulating layer 3' between the porous conductive layer 4 and the second electrical conductor 2 in addition to the previously described constituent members, for example.

The insulating layer 3' contains at least a thermoplastic resin and can optionally further contain a binder, a thickener, and so forth. Any of the thermoplastic resins, binders, and thickeners that were previously described in the "Insulating layer 3" section can be used as the thermoplastic resin, the binder, and the thickener, and the contents of components can be adjusted within any of the ranges previously described in the same section.

The area density of the insulating layer 3' is required to be more than 0.15 mg/cm$^2$. It is also required that when the area density of the insulating layer 3' is taken to be Ma' and the area density of the previously described porous conductive layer 4 is taken to be Mb, a relationship formula: $0.15 \leq Ma'/Mb \leq 2.40$ is satisfied.

Note that a preferred range for the area density Ma' of the insulating layer 3' can be adjusted within any of the same ranges as the preferred ranges for the area density Ma of the insulating layer 3 that were previously described.

Moreover, a preferred range for the value of a mass ratio Ma'/Mb of the area density Ma' of the insulating layer 3' and the area density Mb of the porous conductive layer 4 can be adjusted within any of the same ranges as the preferred ranges for the value of the mass ratio Ma/Mb of the area density Ma of the insulating layer 3 and the area density Mb of the porous conductive layer 4 that were previously described.

<Production Method of Short-Circuit Device for Electrochemical Device>

The following provides a specific description of a production method of the short-circuit device 100 for an electrochemical device as one example of a method of producing the presently disclosed electrochemical device.

No specific limitations are placed on the production method of the short-circuit device 100 for an electrochemical device so long as it is a method including a step of forming a laminate having the previously described first electrical conductor 1, insulating layer 3, porous conductive layer 4, and second electrical conductor 2 positioned in this order.

For example, the production method of the short-circuit device 100 for an electrochemical device may include an insulating layer formation step of forming an insulating layer 3 on at least one surface of a first electrical conductor 1 to obtain a first electrical conductor 1 equipped with an insulating layer 3, a porous conductive layer formation step of forming a porous conductive layer 4 on at least one surface of a second electrical conductor 2 to obtain a second electrical conductor 2 equipped with a porous conductive layer 4, and a stacking step of overlapping the first electrical conductor 1 equipped with the insulating layer 3 and the second electrical conductor 2 equipped with the porous conductive layer 4 such that the insulating layer 3 and the porous conductive layer 4 are opposite to each other (i.e., facing each other).

<<Insulating Layer Formation Step>>

In the insulating layer formation step, an insulating layer 3 is formed on at least one surface of a first electrical conductor 1 to obtain a first electrical conductor 1 equipped with an insulating layer 3.

Any of the methods that were previously described in the "Formation method of insulating layer 3" section can be adopted as the method by which the insulating layer 3 is formed on at least one surface of the first electrical conductor 1 in the insulating layer formation step.

Note that the thickness of the insulating layer 3 that is formed in the insulating layer formation step is preferably 2 μm or more, more preferably 3 μm or more, and even more preferably 4 μm or more, and is preferably 18 μm or less, more preferably 15 μm or less, and even more preferably 10 μm or less. When the thickness of the insulating layer 3 is not less than any of the lower limits set forth above, insulating performance of a produced short-circuit device 100 for an electrochemical device can be further improved. On the other hand, when the thickness of the insulating layer 3 is not more than any of the upper limits set forth above, short-circuiting performance of a produced short-circuit device 100 for an electrochemical device can be further improved.

Note that the thickness of the insulating layer 3 can be measured by a method described in the EXAMPLES section of the present specification.

<<Porous Conductive Layer Formation Step>>

In the porous conductive layer formation step, a porous conductive layer is formed on at least one surface of a second electrical conductor to obtain a second electrical conductor equipped with a porous conductive layer.

Any of the methods that were previously described in the "Formation method of porous conductive layer 4" section can be adopted as the method by which the porous conductive layer 4 is formed on at least one surface of the second electrical conductor 2 in the porous conductive layer formation step.

Note that the thickness of the porous conductive layer 4 that is formed in the porous conductive layer formation step is preferably 2.1 μm or more, preferably 3 μm or more, and even more preferably 5 μm or more, and is preferably 40 μm or less, more preferably 30 μm or less, and even more preferably 20 μm or less. When the thickness of the porous conductive layer 4 is not less than any of the lower limits set forth above, short-circuiting performance of a produced short-circuit device 100 for an electrochemical device can be further improved. On the other hand, when the thickness of the porous conductive layer 4 is not more than any of the upper limits set forth above, insulating performance of a produced short-circuit device 100 for an electrochemical device can be further improved.

Note that the thickness of the porous conductive layer 4 can be measured by a method described in the EXAMPLES section of the present specification.

<<Stacking Step>>

In the stacking step, the first electrical conductor 1 equipped with the insulating layer 3 and the second electrical conductor 2 equipped with the porous conductive layer 4 are overlapped such that the insulating layer 3 and the porous conductive layer 4 are opposite to each other (i.e., facing each other). In this manner, it is possible to obtain a laminate having the previously described first electrical conductor 1, insulating layer 3, porous conductive layer 4, and second electrical conductor 2 positioned in this order as the short-circuit device 100 for an electrochemical device.

Note that when the first electrical conductor 1 equipped with the insulating layer 3 and the second electrical conductor 2 equipped with the porous conductive layer 4 are overlapped in the stacking step, pressure may be applied in a thickness direction of the obtained laminate. Conditions such as pressure, temperature, and time in this pressure application can be adjusted as appropriate to the extent that the desired effects according to the present disclosure are obtained.

(Short-Circuit Device-Equipped Electrochemical Device)

Features of the presently disclosed short-circuit device-equipped electrochemical device are that it includes an electrochemical device and the presently disclosed short-circuit device for an electrochemical device set forth above and that the electrochemical device and the short-circuit device are connected. The presently disclosed short-circuit device-equipped electrochemical device can inhibit the occurrence of thermal runaway due an excessive temperature rise and has excellent safety as a result of the presently disclosed short-circuit device set forth above being connected to the electrochemical device.

Moreover, the presently disclosed short-circuit device-equipped electrochemical device can be produced by connecting the presently disclosed short-circuit device to the electrochemical device.

A lithium ion secondary battery, an electric double-layer capacitor, or the like can be used as the electrochemical device without any specific limitations. Moreover, the shape of the electrochemical device may be a coin type, a button type, a sheet type, a cylinder type, a prismatic type, a flat type, or the like, for example, without any specific limitations.

Connection of the electrochemical device and the short-circuit device can be performed by, for example, electrically connecting one of the first electrical conductor and the second electrical conductor of the short-circuit device to a positive electrode of the electrochemical device and electrically connecting the other thereof to a negative electrode of the electrochemical device.

<Position of Short-Circuit Device>

No specific limitations are placed on the position of the short-circuit device when the electrochemical device and the short-circuit device are connected so long as heat due to temperature rise of the electrochemical device can be conducted to the short-circuit device.

For example, in a case in which the short-circuit device is connected to a battery such as a lithium ion secondary battery serving as the electrochemical device, the short-circuit device may be positioned outside of a battery container of the battery or may be positioned inside of the battery container.

In a case in which a prismatic battery including a prismatic container is used as the electrochemical device, for example, the short-circuit device may be positioned between a positive electrode terminal and a negative electrode terminal that are provided at an outer side of a cover of the prismatic container, or the short-circuit device may be positioned between a positive electrode current collector and a negative electrode current collector at an inner side of the cover of the prismatic container.

Note that in a case in which the short-circuit device is positioned between the positive electrode terminal and the negative electrode terminal that are provided at an outer side of the cover of the prismatic container, one of the first electrical conductor and the second electrical conductor of the short-circuit device can be electrically connected to the positive electrode terminal as a positive electrode, and the other thereof can be electrically connected to the negative electrode terminal as a negative electrode.

Moreover, in a case in which the short-circuit device is positioned between the positive electrode current collector and the negative electrode current collector at an inner side of the cover of the prismatic container, one of the first electrical conductor and the second electrical conductor of the short-circuit device can be electrically connected to the positive electrode current collector as a positive electrode, and the other thereof can be connected to the negative electrode current collector as a negative electrode.

Furthermore, the short-circuit device can be positioned inside of an electrode body that is included in the electrochemical device and that includes a positive electrode, a negative electrode, and a separator. For example, in a case in which the electrode body of the electrochemical device is a roll obtained through winding performed such that a positive electrode, a negative electrode, and first and second separators positioned between the positive and negative electrodes are stacked, the short-circuit device can be positioned in a winding core portion of the roll.

EXAMPLES

The following provides a more specific description of the present disclosure based on examples. However, the present disclosure is not limited to these examples. In the following description, "%" and "parts" used in expressing quantities are by mass, unless otherwise specified.

Moreover, in the case of a polymer that is produced through copolymerization of a plurality of types of monomers, the proportion constituted in the polymer by a structural unit formed through polymerization of a given monomer is normally, unless otherwise specified, the same as the ratio (charging ratio) of the given monomer among all monomers used in polymerization for forming the polymer.

Various measurements and evaluations in the examples and comparative examples were performed according to the following methods.

<Glass-Transition Temperature of Particulate Polymer and Binder>

A particulate polymer and a binder produced in the examples and comparative examples were each used as a measurement sample. The measurement sample was weighed into an aluminum pan in an amount of 10 mg and was then measured by a differential scanning calorimeter (EXSTAR DSC6220 produced by SII NanoTechnology Inc.) under conditions prescribed in JIS Z 8703 with a measurement temperature range of −100° C. to 500° C. and a heating rate of 10° C./min, and with an empty aluminum pan as a reference, so as to obtain a differential scanning calorimetry (DSC) curve. In the heating process, an intersection point of a baseline directly before a heat absorption peak on the DSC curve at which a derivative signal (DDSC) reached 0.05 mW/min/mg or more and a tangent to the DSC curve at a first inflection point to appear after the heat absorption peak was determined as the glass-transition temperature (° C.).

Note that for a particulate polymer having a core-shell structure, measurement samples produced as described below were used. A water dispersion containing a core portion polymer and a water dispersion containing a shell portion polymer serving as measurement samples were respectively produced under the same polymerization conditions as polymerization conditions of the core portion and the shell portion using monomers, various additives, and so forth used in formation of the core portion and the shell portion. The produced water dispersions were each dried to obtain a measurement sample.

<Volume-Average Particle Diameter of Binder>

The volume-average particle diameter of a binder produced in the examples measured by laser diffraction. Specifically, a water dispersion containing the produced binder (adjusted to a solid content concentration of 0.1 mass %) was used as a sample. In a particle diameter distribution (by volume) measured using a laser diffraction particle size analyzer (LS-230 produced by Beckman Coulter, Inc.), the particle diameter D50 at which cumulative volume calculated from a small diameter end of the distribution reached 50% was taken to be the volume-average particle diameter.

<Volume-Average Particle Diameter and Particle Diameter Distribution of Particulate Polymer>

A particulate polymer produced in the examples and comparative examples was used as a measurement sample. An amount equivalent to 0.1 g of the measurement sample was weighed out, was taken into a beaker, and then 0.1 mL of alkyl benzenesulfonic acid aqueous solution (DRIWEL produced by FUJIFILM Corporation) was added thereto as a dispersant. In addition, 10 mL to 30 mL of a diluent (ISOTON II produced by Beckman Coulter, Inc.) was added into the beaker, and then a 20 W (Watt) ultrasonic disperser was used to perform 3 minutes of dispersing. Thereafter, a particle size analyzer (Multisizer produced by Beckman Coulter, Inc.) was used to measure the volume-average particle diameter (Dv) of the measurement sample under conditions of an aperture diameter of 20 μm, a medium of ISOTON II, and a measured particle count of 100,000. In addition, the number-average particle diameter (Dn) was measured and the particle diameter distribution (Dv/Dn) was calculated for the particulate polymer.

<Thickness of Insulating Layer and Porous Conductive Layer>

The thicknesses of an insulating layer and a porous conductive layer were each taken to be an average value of measurements made at 5 arbitrary points using a High-Resolution Digimatic Measuring Unit (LITEMATIC VL-50S-B produced by Mitutoyo Corporation).

<Short-Circuit Initiation Temperature of Short-Circuit Device>

A direct current ohmmeter was connected to a first electrical conductor and a second electrical conductor of a short-circuit device for an electrochemical device produced in the examples and comparative examples, and then the short-circuit device was loaded into an oven and was heated to 200° C. at a heating rate of 5° C./min in order to measure the short-circuit initiation temperature of the short-circuit device. Note that the temperature at a point at which a resistance value measured by the direct current ohmmeter fell below 1 MΩ was taken to be the short-circuit initiation temperature. The short-circuit device for an electrochemical device was evaluated according to the following standard based on the measured short-circuit initiation temperature.

A: Short-circuit initiation temperature of not lower than "reference temperature −2° C." and not higher than "reference temperature+2° C."

B: Short-circuit initiation temperature of not lower than 60° C. and lower than "reference temperature −2° C." or higher than "reference temperature+2° C." and not higher than 200° C.

C: Short-circuit initiation temperature of lower than 60° C. or no short-circuit The "reference temperature" was set according to the type of thermoplastic resin used in an insulating layer of the short-circuit device for an electrochemical device. In a case in which a particulate polymer having a core-shell structure was used as the thermoplastic resin (Examples 1 to 7 and 10 and Comparative Examples 1 to 5), the glass-transition temperature (101° C.) of a polymer B forming a shell portion of the particulate polymer was taken to be the reference temperature, in a case in which polyethylene particles were used as the thermoplastic resin (Example 8), the softening point (110° C.) of the polyethylene particles measured by the ring and ball method in accordance with JIS K2207 was taken to be the reference temperature, and in a case in which ester wax particles were used as the thermoplastic resin (Example 9), the melting point (80° C.) of the ester wax particles was taken to be the reference temperature.

Note that when the short-circuit initiation temperature is within the range described for a C evaluation or when a short-circuit does not occur, this indicates that the short-circuit device does not have both insulating performance and short-circuiting performance and cannot function as a short-circuit device. On the other hand, when the short-circuit initiation temperature is within the range described for a B evaluation, this means that the short-circuit device has both insulating performance and short-circuiting performance and can function as a short-circuit device, and when the short-circuit initiation temperature is within the range described for an A evaluation, this means that the short-circuit device has high levels of both insulating performance and short-circuiting performance and has excellent functionality as a short-circuit device.

Example 1

<Production of Particulate Polymer Having Core-Shell Structure>

[Production of Core Monomer Composition (A)]

A core monomer composition (A) was produced by mixing 65.5 parts of styrene as an aromatic vinyl monomer, 14.4 parts of 2-ethylhexyl acrylate as a (meth)acrylic acid ester monomer, and 0.1 parts of ethylene glycol dimethacrylate as a cross-linkable monomer.

[Production of Shell Monomer Composition (B)]

A shell monomer composition (B) was produced by mixing 9.9 parts of styrene as an aromatic vinyl monomer, 2.0 parts of butyl acrylate as a (meth)acrylic acid ester monomer, 8.0 parts of acrylonitrile as a nitrile group-containing monomer, and 0.1 parts of ethylene glycol dimethacrylate as a cross-linkable monomer.

[Production of Metal Hydroxide]

A colloidal dispersion liquid (A) containing magnesium hydroxide as a metal hydroxide was produced by gradually adding an aqueous solution (A2) of 5.6 parts of sodium hydroxide dissolved in 50 parts of deionized water to an aqueous solution (A1) of 8.0 parts of magnesium chloride dissolved in 200 parts of deionized water under stirring.

[Suspension Polymerization]

A particulate polymer was produced by suspension polymerization. Specifically, the core monomer composition (A) obtained as described above was added to the colloidal dispersion liquid (A) containing magnesium hydroxide, was further stirred therewith, and then 2.0 parts of t-butyl peroxy-2-ethylhexanoate (PERBUTYL O produced by NOF Corporation) was added as a polymerization initiator to yield a mixture. The obtained mixture was subjected to 1 minute of high-shear stirring at a rotation speed of 15,000 rpm using an inline emulsifying/dispersing device (CAVITRON produced by Pacific Machinery & Engineering Co., Ltd.) so as to form droplets of the core monomer composition (A) in the colloidal dispersion liquid (A) containing magnesium hydroxide.

The magnesium hydroxide-containing colloidal dispersion liquid (A) in which droplets of the monomer composition (A) had been formed was loaded into a reactor, and the temperature was raised to 90° C. to perform a polymerization reaction. At the point at which the polymerization conversion rate reached almost 100%, the shell monomer composition (B) and 0.1 parts of 2,2'-azobis(2-methyl-N-(2-hydroxyethyl)-propionamide) (produced by FUJIFILM Wako Pure Chemical Corporation; product name: V-050; water-soluble) as a shell polymerization initiator dissolved in 10 parts of deionized water were added into the reactor, and the reaction was continued at 70° C. for 4 hours. Thereafter, the reaction was quenched by water cooling, and then a water dispersion containing a particulate polymer was obtained. The obtained particulate polymer was confirmed to have a core-shell structure through scanning electron microscope observation.

The water dispersion containing the particulate polymer was stirred while sulfuric acid was added dropwise at room temperature (25° C.) so as to perform acid washing until the pH reached 6.5 or lower. Next, separation was performed by filtration, a slurry was reformed through addition of 500 parts of deionized water to the resultant solid content, and water washing treatment (washing, filtration, and dehydration) was repeated a number of times. Thereafter, separation was performed by filtration to obtain solid content that was then loaded into a vessel of a dryer and was dried at 40° C. for 48 hours to obtain a dried particulate polymer having a core-shell structure.

Upon measurement of the glass-transition temperature, volume-average particle diameter, and particle diameter distribution of the obtained particulate polymer having a core-shell structure, the glass-transition temperature of a polymer A forming a core portion was 66° C., the glass-transition temperature of a polymer B forming a shell portion was 101° C., the volume-average particle diameter of the particulate polymer was 6 μm, and the particle diameter distribution of the particulate polymer was 1.2.

<Production of Water Dispersion Containing Binder (α)>

A reactor including a stirrer was supplied with 70 parts of deionized water, 0.15 parts of sodium lauryl sulfate (EMAL® 2F (EMAL is a registered trademark in Japan, other countries, or both) produced by Kao Corporation) as an emulsifier, and 0.5 parts of ammonium persulfate as a polymerization initiator. The gas phase was purged with nitrogen gas, and the temperature was raised to 60° C.

Meanwhile, a monomer composition (a) was produced in a separate vessel by mixing 50 parts of deionized water, 0.5 parts of sodium dodecylbenzenesulfonate as a dispersion stabilizer, 94 parts of n-butyl acrylate as a (meth)acrylic acid ester monomer, 2 parts of methacrylic acid as a hydrophilic group-containing monomer, 2 parts of acrylonitrile as a nitrile group-containing monomer, and 1 part of allyl methacrylate and 1 part of allyl glycidyl ether as cross-linkable monomers.

The obtained monomer composition (a) was continuously added into the above-described reactor including a stirrer over 4 hours to perform polymerization. The reaction was carried out at 60° C. during the addition. Once the addition was complete, a further 3 hours of stirring was performed at 70° C., and then the reaction was ended to yield a water dispersion containing a particulate binder (α) that was an acrylic polymer. The obtained binder (α) had a volume-average particle diameter of 0.25 μm and a glass-transition temperature of −40° C.

<Production of Slurry Composition for Insulating Layer>

A slurry composition for an insulating layer was obtained by adding 5 parts (in terms of solid content) of the water dispersion containing the binder (α) and 1.5 parts of carboxymethyl cellulose as a thickener to 100 parts of the particulate polymer having a core-shell structure obtained as described above as a thermoplastic resin and further adding and mixing water therewith so as to adjust the solid content concentration to 30%.

<Production of Slurry Composition for Porous Conductive Layer>

A slurry composition for a porous conductive layer was obtained by adding 4 parts (in terms of solid content) of the water dispersion containing the binder (α) and 3 parts of carboxymethyl cellulose as a thickener to 100 parts of acetylene black (Li-400 produced by Denka Company Limited; particle diameter: 0.05 μm) as a conductive material, and further adding and mixing water therewith so as to adjust the solid content concentration to 30%.

<Production of Short-Circuit Device for Electrochemical Device>

[Insulating Layer Formation Step]

The slurry composition for an insulating layer obtained as described above was applied by bar coating with a width of 40 mm onto one surface of an aluminum (Al) foil substrate (thickness: 15 μm; width: 60 mm) serving as a first electrical conductor. Note that the coating weight of the slurry composition for an insulating layer was adjusted such that the area density Ma of an insulating layer formed after drying was 0.5 mg/cm$^2$.

Next, the Al foil substrate with the slurry composition for an insulating layer applied thereon was dried at 50° C. for 10 minutes to obtain an insulating layer-equipped first electrical conductor. Note that the thickness of the formed insulating layer was measured. The result is shown in Table 1.

[Porous Conductive Layer Formation Step]

The slurry composition for a porous conductive layer obtained as described above was applied by bar coating with a width of 40 mm onto one surface of a copper (Cu) foil substrate (thickness: 20 μm; width: 60 mm) serving as a second electrical conductor. Note that the coating weight of the slurry composition for a porous conductive layer was adjusted such that the area density Mb of a porous conductive layer formed after drying was 0.5 mg/cm$^2$.

Next, the Cu foil substrate with the slurry composition for a porous conductive layer applied thereon was dried at 50° C. for 10 minutes to obtain a porous conductive layer-equipped second electrical conductor. Note that the thickness of the formed porous conductive layer was measured. The result is shown in Table 1.

[Stacking Step]

The insulating layer-equipped first electrical conductor and the porous conductive layer-equipped second electrical conductor obtained as described above were each cut to dimensions of a width of 10 mm, a coated section (i.e., a section where the insulating layer or porous conductive layer was formed) length of 20 mm, and a non-coated section length of 10 mm. Next, the insulating layer-equipped first electrical conductor and the porous conductive layer-equipped second electrical conductor were overlapped such that the insulating layer and the porous conductive layer were opposite to each other (facing each other) and were pressure bonded with a pressure of 0.7 MPa for 30 seconds at room temperature to obtain a short-circuit device for an electrochemical device. Note that the area of a section where the insulating layer and the porous conductive layer were opposite to each other was 200 mm$^2$.

The obtained short-circuit device for an electrochemical device was used to perform measurement of the short-circuit initiation temperature. The result is shown in Table 1.

Comparative Example 1

A short-circuit device for an electrochemical device was produced and measurement of the short-circuit initiation temperature was performed in the same way as in Example 1 with the exception that in production of the short-circuit device for an electrochemical device, the porous conductive layer formation step was not performed, and, in the stacking step, a second electrical conductor (Cu foil substrate) on which a porous conductive layer had not been formed was used instead of the porous conductive layer-equipped second electrical conductor, and the insulating layer-equipped first electrical conductor and this second electrical conductor were overlapped and pressure bonded. The results are shown in Table 1.

Comparative Examples 2 and 3 and Examples 2 to 6

A short-circuit device for an electrochemical device was produced and measurement of the short-circuit initiation temperature was performed in the same way as in Example 1 with the exception that in production of the short-circuit device for an electrochemical device, the coating weight of the slurry composition for a porous conductive layer was changed in the porous conductive layer formation step such that the area density Mb of the formed porous conductive layer was a value shown in Table 1. The results are shown in Table 1.

Comparative Examples 4 and 5 and Example 7

A short-circuit device for an electrochemical device was produced and measurement of the short-circuit initiation temperature was performed in the same way as in Example 1 with the exception that in production of the short-circuit device for an electrochemical device, the coating weight of the slurry composition for an insulating layer was changed in the insulating layer formation step such that the area density Ma of the formed insulating layer was a value shown in Table 1, and the coating weight of the slurry composition for a porous conductive layer was changed in the porous conductive layer formation step such that the area density Mb of the formed porous conductive layer was a value shown in Table 1. The results are shown in Table 1.

Example 8

A short-circuit device for an electrochemical device was produced and measurement of the short-circuit initiation temperature was performed in the same way as in Example 1 with the exception that in production of the short-circuit device for an electrochemical device, a slurry composition for an insulating layer produced using 100 parts of polyethylene particles (CHEMIPEARL W401 produced by Mitsui Chemicals, Inc.) instead of 100 parts of the particulate polymer having a core-shell structure as a thermoplastic resin was used in the insulating layer formation step, and the coating weight of the slurry composition for a porous conductive layer was changed in the porous conductive layer formation step such that the area density Mb of the formed porous conductive layer was a value shown in Table 1. The results are shown in Table 1.

Example 9

A short-circuit device for an electrochemical device was produced and measurement of the short-circuit initiation temperature was performed in the same way as in Example 1 with the exception that in production of the short-circuit device for an electrochemical device, a slurry composition for an insulating layer produced using 100 parts of ester wax particles (NISSAN ELECTOL WEP-5 produced by NOF Corporation; wax particles formed of ester compound of fatty acid and polyhydric alcohol (polyol)) instead of 100 parts of the particulate polymer having a core-shell structure as a thermoplastic resin was used in the insulating layer formation step, the coating weight of the slurry composition for an insulating layer was changed in the insulating layer formation step such that the area density Ma of the formed insulating layer was a value shown in Table 1, and the coating weight of the slurry composition for a porous conductive layer was changed in the porous conductive layer formation step such that the area density Mb of the formed porous conductive layer was a value shown in Table 1. The results are shown in Table 1.

Example 10

A short-circuit device for an electrochemical device was produced and measurement of the short-circuit initiation temperature was performed in the same way as in Example 1 with the exception that in production of the short-circuit device for an electrochemical device, a slurry composition for a porous conductive layer produced using 100 parts of multi-walled carbon nanotubes (multi-walled CNTs) (BET specific surface area: 250 $m^2/g$; average diameter: 10 nm; average length: 7 μm) instead of 100 parts of acetylene black as a conductive material was used in the porous conductive layer formation step. The results are shown in Table 1.

TABLE 1

| | Insulating layer | | | Porous conductive layer | | | | Short-circuit initiation temperature | |
|---|---|---|---|---|---|---|---|---|---|
| | Thermoplastic resin | Thickness [μm] | Area density Ma [$mg/cm^2$] | Conductive material | Thickness [μm] | Area density Mb [$mg/cm^2$] | Ma/Mb | [° C.] | Evaluation |
| Comparative Example 1 | Particulate polymer | 10.0 | 0.50 | Acetylene black | 0.0 | 0.00 | — | No short-circuit | C |
| Comparative Example 2 | Particulate polymer | 10.0 | 0.50 | Acetylene black | 2.0 | 0.20 | 2.50 | No short-circuit | C |
| Example 1 | Particulate polymer | 10.0 | 0.50 | Acetylene black | 5.0 | 0.50 | 1.00 | 102 | A |
| Example 2 | Particulate polymer | 10.0 | 0.50 | Acetylene black | 2.5 | 0.25 | 2.00 | 106 | B |
| Example 3 | Particulate polymer | 10.0 | 0.50 | Acetylene black | 3.1 | 0.33 | 1.52 | 102 | A |
| Example 4 | Particulate polymer | 10.0 | 0.50 | Acetylene black | 10.2 | 1.01 | 0.50 | 100 | A |
| Example 5 | Particulate polymer | 10.0 | 0.50 | Acetylene black | 19.5 | 2.05 | 0.24 | 100 | A |
| Example 6 | Particulate polymer | 10.0 | 0.50 | Acetylene black | 30.0 | 3.25 | 0.15 | 98 | B |
| Comparative Example 3 | Particulate polymer | 10.0 | 0.50 | Acetylene black | 41.3 | 4.00 | 0.13 | 25 | C |
| Comparative Example 4 | Particulate polymer | 19.0 | 1.00 | Acetylene black | 2.5 | 0.25 | 4.00 | No short-circuit | C |
| Example 7 | Particulate polymer | 5.5 | 0.25 | Acetylene black | 2.5 | 0.25 | 1.00 | 102 | A |
| Comparative Example 5 | Particulate polymer | 5.0 | 0.15 | Acetylene black | 2.5 | 0.25 | 0.60 | 25 | C |
| Example 8 | Polyethylene particles | 10.0 | 0.50 | Acetylene black | 10.2 | 1.01 | 0.50 | 110 | A |
| Example 9 | Ester wax particles | 5.5 | 0.50 | Acetylene black | 10.2 | 1.01 | 0.50 | 81 | A |
| Example 10 | Particulate polymer | 10.0 | 0.50 | Multi-walled CNTs | 5.0 | 0.50 | 1.00 | 102 | A |

It can be seen from Table 1 that the short-circuit device for an electrochemical device of each of Examples 1 to 10, which was obtained by positioning a porous conductive layer between a first electrical conductor and a second electrical conductor, by further positioning an insulating layer containing a thermoplastic resin and having an area density of more than a specific value between the porous conductive layer and the first electrical conductor and/or between the porous conductive layer and the second electrical conductor, and by adjusting the area density of the insulating layer and the area density of the porous conductive layer so as to satisfy a specific relationship formula, can function as a short-circuit device without the need for a member applying external force.

In contrast, it can be seen that the short-circuit device for an electrochemical device of Comparative Example 1, which does not include a porous conductive layer, cannot function as a short-circuit device.

It can also be seen that the short-circuit device for an electrochemical device of each of Comparative Examples 2 to 4, in which the area density of an insulating layer and the area density of a porous conductive layer do not satisfy a specific relationship formula, also cannot function as a short-circuit device.

It can also be seen that the short-circuit device for an electrochemical device of Comparative Example 5, in which the area density of an insulating layer is not more than a specific value, also cannot function as a short-circuit device.

INDUSTRIAL APPLICABILITY

According to the present disclosure, it is possible to provide a short-circuit device for an electrochemical device that can function as a short-circuit device without the need for a member applying external force.

Moreover, according to the present disclosure, it is possible to provide a short-circuit device-equipped electrochemical device that includes this short-circuit device for an electrochemical device.

REFERENCE SIGNS LIST

1 first electrical conductor
2 second electrical conductor
3 insulating layer
4 porous conductive layer
100 short-circuit device for electrochemical device

The invention claimed is:

1. A short-circuit device for an electrochemical device comprising:

a first electrical conductor;

a second electrical conductor;

a porous conductive layer positioned between the first electrical conductor and the second electrical conductor; and an insulating layer positioned either or both of between the porous conductive layer and the first electrical conductor and between the porous conductive layer and the second electrical conductor, wherein the insulating layer contains a thermoplastic resin, the insulating layer has an area density of more than 0.15 $mg/cm^2$, and when the area density of the insulating layer is taken to be Ma and area density of the porous conductive layer is taken to be Mb, a relationship formula: $0.15 \leq Ma/Mb \leq 2.40$ is satisfied.

2. The short-circuit device for an electrochemical device according to claim 1, wherein the thermoplastic resin includes a particulate thermoplastic resin.

3. The short-circuit device for an electrochemical device according to claim 1, wherein the thermoplastic resin includes a particulate polymer having a core-shell structure.

4. The short-circuit device for an electrochemical device according to claim 1, wherein the porous conductive layer contains a conductive material that includes a carbon material.

5. A short-circuit device-equipped electrochemical device comprising:

an electrochemical device; and the short-circuit device for an electrochemical device according to claim 1, wherein the electrochemical device and the short-circuit device for an electrochemical device are connected.

* * * * *